United States Patent
Fujii et al.

(10) Patent No.: US 6,782,368 B2
(45) Date of Patent: Aug. 24, 2004

(54) MEDIA PROCESSING APPARATUS THAT OPERATES AT HIGH EFFICIENCY

(75) Inventors: Shigeki Fujii, Neyagawa (JP); Shintarou Nakatani, Amagasaki (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 314 days.

(21) Appl. No.: 10/217,172

(22) Filed: Aug. 12, 2002

(65) Prior Publication Data

US 2003/0014264 A1 Jan. 16, 2003

Related U.S. Application Data

(63) Continuation of application No. 09/198,854, filed on Nov. 24, 1998, now abandoned.

(30) Foreign Application Priority Data

Nov. 28, 1997 (JP) .............................................. 9-327434

(51) Int. Cl.[7] ............................................. G10L 19/00
(52) U.S. Cl. ...................................... 704/500; 704/502
(58) Field of Search ..................... 704/500; 375/240.16, 375/240.26

(56) References Cited

U.S. PATENT DOCUMENTS

| | | | | |
|---|---|---|---|---|
| 5,502,573 A | * | 3/1996 | Fujinami | ..................... 386/65 |
| 5,596,369 A | | 1/1997 | Chau | |
| 5,630,105 A | | 5/1997 | Itagaki | |
| 5,675,424 A | | 10/1997 | Park | |
| 5,949,891 A | * | 9/1999 | Wagner et al. | ................. 381/98 |
| 5,959,684 A | * | 9/1999 | Tan et al. | .................... 348/515 |
| 6,012,116 A | * | 1/2000 | Aybay et al. | ............... 710/113 |
| 6,018,765 A | * | 1/2000 | Durana et al. | ............... 709/217 |
| 6,105,127 A | * | 8/2000 | Kimura et al. | .............. 712/215 |
| 6,157,770 A | * | 12/2000 | Sakamoto | ..................... 386/68 |
| 6,226,291 B1 | * | 5/2001 | Chauvel et al. | ......... 375/240.26 |

FOREIGN PATENT DOCUMENTS

| | | |
|---|---|---|
| EP | 710029 | 5/1996 |
| EP | 714213 | 5/1996 |
| EP | 790557 | 8/1997 |
| JP | 8298663 | 11/1996 |
| JP | 9084004 | 3/1997 |

OTHER PUBLICATIONS

Nikkei Electronics, Toshiba Develops HDTV Compatible Real-Time Decoding, Nikkei Business Publications, Inc., Mar. 14, 1994 (No. 603), pp. 93–100 (partial translation included).

* cited by examiner

*Primary Examiner*—Doris H. To
*Assistant Examiner*—Michael Opsasnick

(57) ABSTRACT

A media processing apparatus includes an input/output processing unit that performs input/output processing that is asynchronously caused by external factors and a decode processing unit that operates in parallel with the input/output processing unit and mainly performs decode processing for a data stream stored in a memory. The input/output processing receives an asynchronous input of a data stream from outside, stores the data stream into the memory, and supplies a data stream stored in the memory to the decode processing unit. The decode processing unit includes a sequential processing unit and a routine processing unit. The sequential processing unit performs header analysis for compressed video data in the data stream and a complete decode for compressed audio data in the data stream. Based on the results of the header analysis, the routine processing unit performs all of the decoding of the compressed video data aside from the header analysis. In the sequential processing unit, the header analysis is given priority over the decoding of the compressed audio data.

20 Claims, 18 Drawing Sheets

FIG. 9

| | INTERRUPT TYPE | SOURCE | CAUSE OF INTERRUPT |
|---|---|---|---|
| ① | HEADER ANALYSIS END SIGNAL | HEADER ANALYSIS PROCESSING | END OF HEADER ANALYSIS FOR ONE MACROBLOCK |
| ② | FRAME END SIGNAL | HEADER ANALYSIS PROCESSING | END OF HEADER ANALYSIS FOR ALL MACROBLOCKS IN ONE FRAME |
| ③ | VLD BUSY SIGNAL | CODE TRANSLATION UNIT 9 | DATA CORRESPONDING TO COMMAND IN THE HEADER ANALYSIS PROCESSING HAS NOT BEEN PREPARED |
| ④ | VLD END SIGNAL | CODE TRANSLATION UNIT 9 | VLD PROCESSING COMPLETE FOR DATA CONTENT OF MACROBLOCK |
| ⑤ | VERTICAL SYNCH SIGNAL | INPUT FROM OUTSIDE | VERTICAL SYNCH SIGNAL INPUTTED FROM OUTSIDE |
| ⑥ | VLD READY SIGNAL | CODE TRANSLATION UNIT 9 | PREPARATION COMPLETE FOR DATA CORRESPONDING TO COMMAND IN THE HEADER ANALYSIS PROCESSING |
| ⑦ | AUDIO DATA BUSY SIGNAL | FIFO MEMORY 4 | COMPRESSED AUDIO DATA REQUESTED BY PROCESSOR 7 HAS NOT BEEN INPUTTED INTO FIFO MEMORY 4 FROM EXTERNAL MEMORY 3 |
| ⑧ | AUDIO DATA READY SIGNAL | FIFO MEMORY 4 | COMPRESSED AUDIO DATA REQUESTED BY PROCESSOR 7 HAS BEEN INPUTTED INTO FIFO MEMORY 4 FROM EXTERNAL MEMORY 3 |
| ⑨ | VLD ERROR SIGNAL | CODE TRANSLATION UNIT 9 | ERROR HAS OCCURRED DURING THE VLD PROCESSING |
| ⑩ | MOTION COMPENSATION ERROR SIGNAL | PIXEL READ/ WRITE UNIT 11 | ERROR HAS OCCURRED DURING THE MOTION COMPENSATION PROCESSING |

| THREAD | STATE |
|---|---|
| VIDEO THREAD | EXECUTE |
| AUDIO THREAD | READY |

MEDIA PROCESSING APPARATUS THAT OPERATES AT HIGH EFFICIENCY

This is a continuation application of U.S. Ser. No. 09/198,854, filed on Nov. 24, 1998 now abandoned.

BACKGROUND OF THE INVENTION

1. Field of the Invention

The present invention relates to digital signal processing, and in particular to a media processing apparatus that decompresses compressed video data and compressed audio data, and can also compress video data and audio data and perform graphics processing.

2. Description of the Related Art

With the development of compressing/decompressing techniques for digital video data and the improvements in LSI (Large Scale Integration) technology in recent years, various media processing circuits have come to be highly valued. Examples of such are a decoder that decodes (decompresses) compressed video and audio data, an encoder that compresses video and audio data, and a graphics processor that processes graphics.

As one example of conventional techniques, an AV (Audio Visual) decoder decodes video data and audio data compressed according to MPEG (Moving Picture Experts Group) standard. This AV decoder uses two processors, with one processor decoding video data and the other processor decoding audio data.

FIG. 1 shows a representation of the decode processing performed by this AV decoder. In FIG. 1, the vertical axis represents time and the horizontal axis represents the respective computational complexity of the video decoding performed by the video processor and the audio decoding performed by the audio processor.

The video processor alternately performs sequential processing for compressed video data in macroblock units and decode processing for the actual video data. The sequential processing part of the video decoding analyzes the header part of a macroblock being processed, and so is hereinafter referred to as "header analysis". The decode processing decodes the compressed video data in a macroblock, and so is hereinafter referred to as "block decoding". Of these, header analysis requires judgement of various conditions and has a low computational complexity. Block decoding decodes the variable-length codes in an MPEG stream using the various kinds of data produced by the header analysis, and also performs IQ (Inverse Quantization) and IDCT (Inverse Discrete Cosine Transform) processing in block units. This means that the block decoding has a high computational complexity.

The audio processor alternately performs sequential processing for compressed audio data and decoding processing for the actual audio data.

The above technique has the following problems.

The first problem is the cost of manufacturing this AV decoder. In particular, the video processor needs to be a high performance processor that can perform real-time processing on a large amount of video data. This means that a processor with a high clock speed must be used. Such processors are expensive.

When the media processing apparatus described above is used in an AV decoder provided in a digital (satellite) broadcast tuner (called an STB (Set Top Box)) or a DVD (Digital Versatile/Video Disc) player, MPEG streams received on a broadcast wave or read from a disc are inputted. The AV decoder decodes these MPEG streams, and outputs video signals and audio signals to a display and speakers, respectively. This series of processes requires a huge amount of processing. For this reason, there has been increasing demand for a media processing apparatus which can efficiently execute this huge amount of processing.

SUMMARY OF THE INVENTION

It is a first object of the present invention to provide a media processing apparatus that performs a series of processes composed of the input of stream data that expresses compressed video and compressed audio, decoding of the data, and output of the result, the media processing apparatus having a high performance without operating at a high clock frequency. This reduces the manufacturing cost of the media processing apparatus.

The first object can be achieved by a media processing apparatus that decodes a data stream including compressed audio data and compressed video data to obtain video data and audio data, the media processing apparatus including: a sequential processing unit for performing a header analysis process on the compressed video data and an audio decode process on the compressed audio data, the header analysis process being given priority over the audio decode process and being a header analysis for a predetermined block included in the compressed video data in the data stream, and the audio decode process being a decode process for the compressed audio data; and a routine processing unit for performing a decode process for the compressed video data aside from the header analysis process, the routine processing unit operating in parallel with the sequential processing unit.

With the stated construction, the processing load of the decoding of compressed video data is shared by the sequential processing unit and the routine processing unit, so that the processing load is less than when the entire decode was conventionally handled by a single processor. This raises the overall processing efficiency. The sequential processing unit performs the header analysis process with priority over the audio decode process, so that the decode process of the routine processing unit that is based on the header analysis is performed without delay. This speeds up the overall processing of the media processing apparatus. The audio decode process requires considerably less processing than the decode process for the compressed video data, and is performed by the sequential processing unit in between header analysis processes which also results in higher processing efficiency. Consequently, the media processing apparatus of the present invention achieves a high performance without operating at a high clock frequency, thereby reducing the manufacturing cost of the media processing apparatus.

Here, the sequential processing unit may include a processor and a memory that stores a header analysis thread, an audio decode thread, and a thread switching thread, the processor executing the threads in the memory to realize: a header analysis unit that performs the header analysis process as a result of the processor executing the header analysis thread in the memory; an audio decode unit that performs the audio decode process as a result of the processor executing the audio decode thread in the memory; and a control unit that controls a switching of a thread assigned to the processor so that the header analysis process is given priority over the audio decode process, the control unit being realized by the processor executing the control thread.

With the present construction, the control unit assigns threads to the processor so that the header analysis process is executed with priority. As a result, the media processing apparatus smoothly switches between the header analysis process and the audio decode process and so can process data streams with high efficiency.

Here, the control unit may include: an interrupt detection unit for detecting an occurrence of any of a plurality of interrupts that cause a switching of thread; a state management unit for managing a state of the header analysis unit and a state of the audio decode unit based on a type of detected interrupt, each state being one of an execute state, a wait state, and a ready state; and a switching unit for switching, when the state of the header analysis unit has changed from the wait state to the ready state, a thread assigned to the processor to the header analysis thread.

With the stated construction, the control unit has an interrupt detection unit, a state management unit, and a switching unit. The interrupt detection unit detects interrupts. The state management unit manages changes in the states of the header analysis process and the audio decode process that are caused by interrupts detected by the interrupt detection unit. The switching unit assigns the header analysis thread to the processor when the state of the header analysis unit changes to the ready state. As a result, the control unit is a system that is activated by interrupts, so that there is no need to constantly monitor which of the header analysis unit and the audio decode process should be set in the execute state.

Here, the state management unit may include: a state table for storing the state of the header analysis unit and the state of the audio decode unit; and a state updating unit for updating the state table based on the type of detected interrupt.

Here, the predetermined block may be a macroblock included in the compressed video data in the data stream, and the interrupt detecting unit may be capable of detecting a type 1 interrupt and a type 2 interrupt, the type 1 interrupt being outputted by the header analysis unit on completing the header analysis process for one macroblock and the type 2 interrupt being outputted by the routine processing unit on completing the decode process for one macroblock, the state updating unit changing the state of the header analysis unit in the state table to the wait state when the interrupt detecting unit has detected the type 1 interrupt and changing the state of the state of the header analysis unit in the state table to the ready state when the interrupt detecting unit has detected the type 2 interrupt.

With the stated construction, when the interrupt detection unit detects the type 1 or type 2 interrupt, the state updating unit updates the state of the header analysis unit in the state table to the wait state or the ready state. When the state of the header analysis process has changed to the ready state, the switching unit assigns the header analysis thread to the processor. This means that when the decoding of the header part has been completed by the routine processing unit, the header analysis process will soon be commenced. This improves the processing efficiency.

Here, when the header analysis unit is in the wait state and the state of the audio decode unit has changed from the wait state to the ready state, the switching unit may switch a thread assigned to the processor to the audio decode thread.

With the stated construction, when the state of the header analysis unit becomes the ready state, the switching unit assigns the header analysis thread to the processor even if the audio decode unit is presently in the execute state. This means that the header analysis process is executed with priority over the audio decode process, which raises the overall processing efficiency of the media processing apparatus.

Here, the routine processing unit may include: a data conversion unit for performing a variable length decode on the compressed video data; a calculation unit for performing an inverse quantization and an inverse discrete cosine transform on image blocks resulting from the variable length decode; and a synthesizing unit for performing a motion compensation process by synthesizing image blocks resulting from the inverse discrete cosine transform with previously decoded image blocks to produce decoded image data, and the header analysis unit may include: an obtaining unit for issuing obtaining header information that has been subjected to a variable length decode by issuing an indication to the data conversion unit; an analysis unit for performing analysis on the obtained header information and then calculating motion vectors; a notification unit for notifying the routine processing unit of parameters obtained by the analysis of the analysis unit; and a start indication unit for issuing a start indication to the data conversion unit at a predetermined point during the header analysis processing, the start indication having the data conversion unit start a variable length decode on compressed image data aside from the header information.

With the stated construction, the decode processing of compressed video data is split between the analysis unit and the routine processing unit. In the routine processing unit, processing centered on a routine calculation of data is executed by a pipeline architecture including the data conversion unit, the calculation unit, and the synthesizing-unit. In the header analysis unit, the analysis unit performs the header analysis that is processing which accompanies a judgement of conditions, and the notification unit notifies the routine processing unit of the parameters obtained as the analysis result. This means that the decode process for the compressed video data is divided based on the nature of the processing into routine calculation processing and condition judgement processing, enabling the processing by the routine processing unit to be performed at high speed. Since the header analysis unit indicates the start of a variable length decode for blocks to the data conversion unit at a predetermined point during the analysis, the routine processing unit can commence its processing sooner. This reduces the total time taken by the decode processing (the combined processing of the sequential processing unit and the routine processing unit) for one macroblock.

Here, the start indication unit may issue the start indication before the analysis unit calculates the motion vectors, and the notification unit may notify the synthesis unit of the calculated motion vectors.

With the stated construction, the start indication unit indicates a start of a variable length decode before the calculation of motion vectors by the analysis unit. This reduces the overall time taken to decode each macroblock by the time taken to calculate the motion vectors.

Here, the control unit may include: an interrupt detection unit for detecting an occurrence of an interrupt that causes a switching of thread; an error processing unit for having the routine processing unit discard data relating to a predetermined block when an error interrupt has been detected by the interrupt detection unit and for changing a state of the header analysis unit to a ready state; and a state management unit for managing a state of the header analysis unit and a state of the audio decode unit based on a type of detected interrupt, each state being one of an execute state, a wait state, and a ready state; and a switching unit for switching a thread assigned to the processor to the header analysis thread when the state of the header analysis unit has changed from the wait state to the ready state.

With the stated construction, the control unit includes an error processing unit in addition to the interrupt detection unit, state management unit, and switching unit. When an error interrupt has been detected, the error processing unit resets every component in the routine processing unit and sets the header analysis unit into the ready state. As a result, the header analysis thread is assigned to the processor and header analysis is performed for a macroblock in the next slice. This means that when an error has occurred, the control unit in the present media processing apparatus can smoothly assign the header analysis thread to the processor, which improves the overall processing efficiency.

Here, the predetermined block may be a macroblock included in the compressed video data in the data stream, the interrupt detecting unit may be capable of detecting a type 1 interrupt, a type 2 interrupt, a type 3 interrupt and a type 4 interrupt, the type 1 interrupt being outputted by the header analysis unit on completing the header analysis process for one macroblock, the type 2 interrupt being outputted by the routine processing unit on completing the decode process for one macroblock, the type 3 interrupt being outputted by the data conversion unit when an error has occurred during a variable length decode, and the type 4 interrupt being outputted by the synthesizing unit when an error has occurred during the motion compensation process, wherein the state updating unit may change the state of the header analysis unit in the state table to the wait state when the interrupt detecting unit has detected the type 1 interrupt and change the state of the state of the header analysis unit in the state table to the ready state when the interrupt detecting unit has detected the type 2 interrupt, and wherein when one of the type 3 interrupt and the type 4 interrupt has been detected by the interrupt detection unit, the error processing unit may have the routine processing unit discard data relating to a predetermined block and the state updating unit may change the state of the header analysis unit to the ready state.

With the stated construction, when an error has occurred during the variable length decode by the data conversion unit or during the motion compensation process by the synthesizing unit, the error processing unit resets each component of the routine processing unit and then sets the header analysis unit into the ready state. As a result, the header analysis thread is assigned to the processor and the header analysis process is performed for a macroblock in the next slice. This means that the control unit of the present media processing apparatus is able to smoothly assign the header analysis thread to the processor even when an error has occurred, thereby raising the processing efficiency.

Here, the interrupt detecting unit may be capable of detecting eight types of interrupts numbered type 1 to type 8, a type 1 interrupt being outputted by the header analysis unit on completing the header analysis process for a predetermined block, a type 2 interrupt being outputted by the routine processing unit on completing the decode process for a predetermined block, a type 3 interrupt being outputted by the header analysis unit on completing the header analysis process for every predetermined block in a frame, a type 4 interrupt being outputted by the data conversion unit if the variable length decode is not complete for the header information when the obtaining unit issues the indication, a type 5 interrupt being a vertical synch signal inputted from outside the media processing apparatus, a type 6 interrupt being outputted by the data conversion unit after the type 4 interrupt when the variable length decode is complete for the header information, a type 7 interrupt being outputted by the memory when the memory does not have data that has been requested by the audio decode unit, and a type 8 interrupt being outputted by the memory after the type 7 interrupt when the data that has been requested by the audio decode unit has been inputted into the memory, the state updating unit changing the state of the header analysis unit in the state table to the wait state when the interrupt detection unit has detected any of the type 1 interrupt, the type 3 interrupt, and the type 4 interrupt, the state of the header analysis unit in the state table to the ready state when the interrupt detection unit has detected any of the type 2 interrupt, the type 5 interrupt and the type 6 interrupt, the state of the audio decode unit in the state table to the wait state when the interrupt detection unit has detected the type 7 interrupt, and the state of the audio decode unit in the state table to the ready state when the interrupt detection unit has detected the type 8 interrupt.

With the stated construction, the state updating unit updates the states of the header analysis unit and the audio decode unit in accordance with the detection of type 1 to type 8 interrupts by the interrupt detection unit. As a result of this updating, the switching unit has the header analysis thread and the audio decode thread assigned to the processor with priority being given to the header analysis thread. The control unit is able to smoothly assign the header analysis thread and the audio decode thread to the processor even when the various types of interrupts occur, so that the overall processing efficiency is raised.

The stated object of the present invention can also be achieved by a computer-readable storage medium storing a program which has a computer decode a data stream including compressed audio data and compressed video data to obtain video data and audio data, the program including: a header analysis process for analyzing a header of a predetermined block included in the compressed video data in the data stream; an audio decode process for decoding the compressed audio data in the data stream; a control process for switching between the header analysis processing and the audio decode process, giving priority to the header analysis processing; and a routine process for performing a decode process for the compressed video data in the data stream, the decode process not including the header analysis process.

Here, the computer may be a media processing apparatus that has a first processor and a second processor, the first processor executing the header analysis process, the audio decode process and the control process and the second processor executing the routine process.

With the stated construction, the first processor prioritizes the execution of the header analysis process and so executes the header analysis process without delay. When execution of the header analysis process is not possible, the first processor executes the audio decode processing, thereby increasing the processing throughput. Since the first processor executes the header analysis processing without delay, the second processor can quickly receive the processing results of the header analysis process and so quickly commences the routine process.

Here, the control process may include: an interrupt detection process for detecting an interrupt that causes a switching between the header analysis process and the audio decode process and a type of interrupt; a state management process for managing a state of the header analysis process and a state of the audio decode process based on the type of interrupt that has been detected, each state being one of an execute state, a wait state, and a ready state; and a switching process for switching, when the state of the header analysis process has changed from the wait state to the ready state, a process executed by the first processor from the audio decode process to the header analysis process.

With the stated construction, the first processor commences the header analysis process as soon as the header analysis process changes to the ready state. This improves the overall processing efficiency.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 9 is a table showing the various interrupt signals detected by the OS;

DESCRIPTION OF THE PREFERRED EMBODIMENT

The following is a description of a media processing apparatus of the present invention, with the description of-the embodiment having been divided into the following sections.

1 The Overall Structure of the Media Processing Apparatus
  1.1 The Input/Output Processing Unit
  1.2 The Decode Processing Unit
    1.2.1 The Sequential Processing Unit
    1.2.2 The Routine Processing Unit
2 The Structure of the Media Processing Apparatus
  2.1 The Structure of the Input/Output Processing Unit
  2.2 The Structure of the Decode Processing Unit
    2.2.1 The Sequential Processing Unit
      2.2.1.1 Header Analysis Processing
      2.2.1.2 Audio Decode Processing
    2.2.2 The Routine Processing Unit
3 Operation Timing of the Components
4 OS (Operating System) of The Routine Processing Unit
  4.1 Interrupt Signals
  4.2 State Transition of Threads
    4.2.1 Video thread
    4.2.2 Audio thread
  4.3 Thread Processing
  4.4 Assignment to the Processor
  4.5 Error Processing
5 Operation
  5.1 Operation of the Input/Output Processing Unit
  5.2 Operation of the Decode Processing Unit
    5.2.1 Standard Operation
    5.2.2 Operation for a VLD Error
    5.2.3 Operation for a Motion Compensation Error
Preferred Embodiment The media processing apparatus of the present embodiment is provided in an STB, a DVD device, a DVD-RAM recording/reproduction device, or the like. The media processing apparatus receives an input of MPEG streams as compressed video and audio data from the satellite broadcast or the DVD, and performs decompression processing (referred to as "decoding" hereinafter), before outputting video signals and audio signals to external output devices.

1. The Overall Structure of the Media Processing Apparatus

Figure 1:
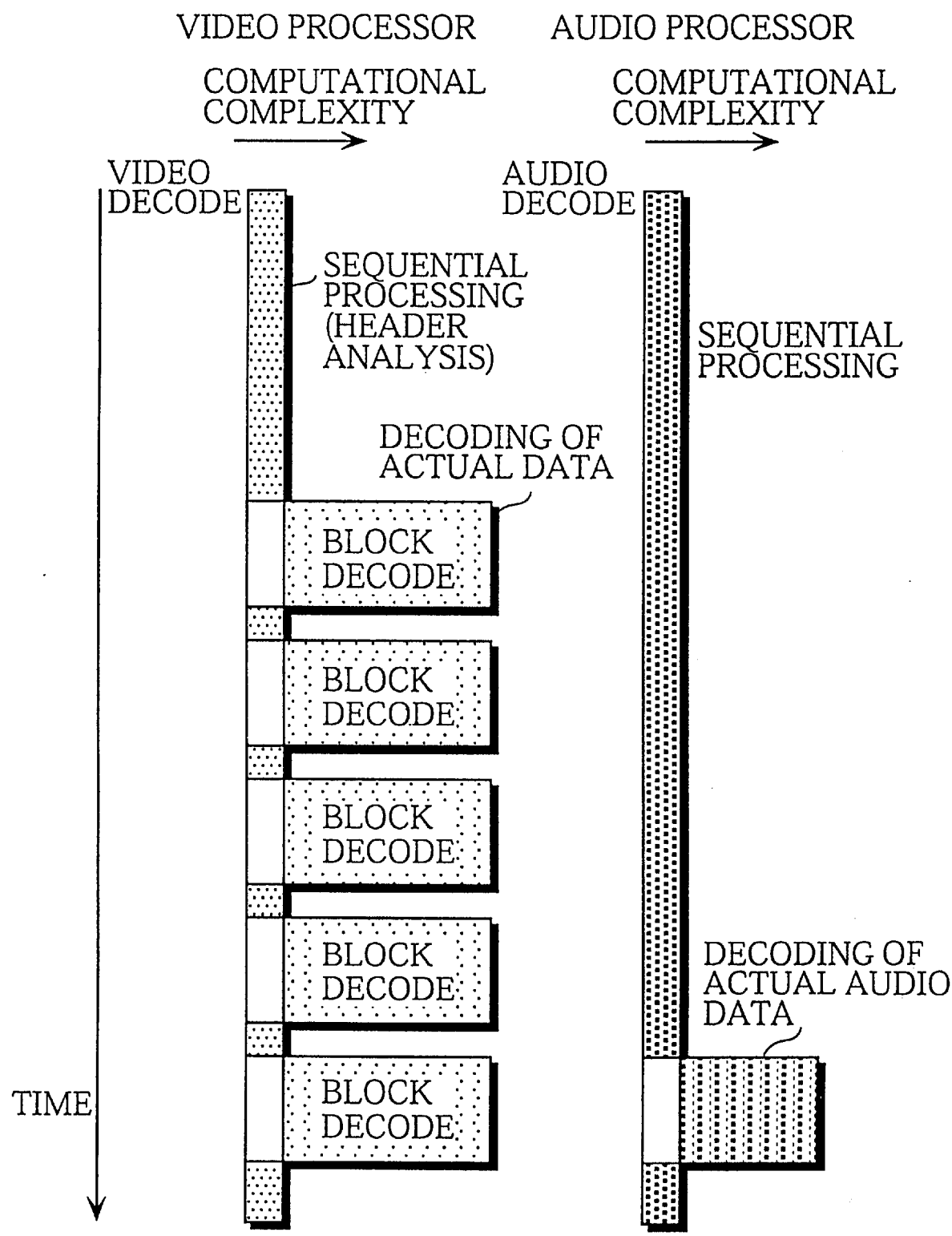
FIG. 1 shows a representation of the decode processing performed by a conventional AV decoder.
Figure 2:
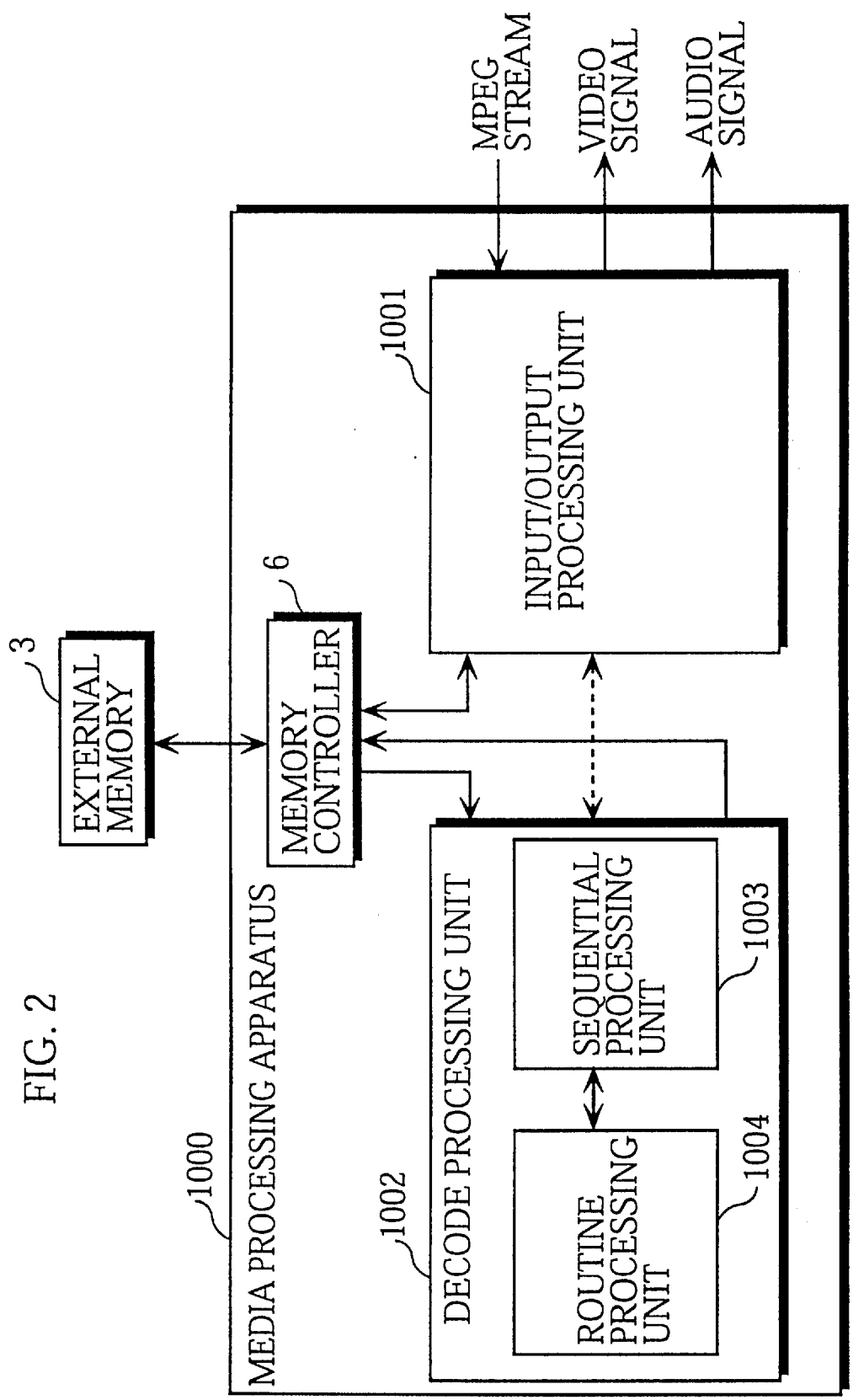
FIG. 2 is a block diagram showing the overall construction of a media processing apparatus in an embodiment of the present invention.

FIG. 2 is a block diagram showing the overall structure of a media processing apparatus of the embodiment of the present invention.

A media processing apparatus 1000 is composed of an input/output processing unit 1001, a decode processing unit 1002, and a memory controller 6. The media processing apparatus 1000 performs input/output processing and decode processing in parallel. The media processing apparatus 1000 uses an external memory 3 as a work memory for temporarily storing an MPEG stream and decoded audio data, and as a frame memory for storing decoded video data.

1.1 The Input/Output Processing Unit

The input/output processing unit 1001 performs input/output processing which does not occur in synchronization with the operation of the media processing apparatus 1000. The input/output processing includes: (a) inputting an MPEG stream which is asynchronously and externally inputted and temporarily storing the MPEG stream in the external memory 3; (b) supplying an MPEG stream stored in the external memory 3 to the decode processing unit 1002; and (c) reading decoded video and audio data from the external memory 3 and respectively outputting the decoded video data and the decoded audio data to an external display device (not illustrated) and an external audio output device (not illustrated) in accordance with respective output rates of these devices.

1.2 The Decode Processing Unit

The decode-processing unit 1002 decodes the MPEG stream supplied by the input/output processing unit 1001 and stores the decoded video data and decoded audio data into the external memory 3. This operation of the decode processing unit 1002 is performed independently of and in parallel with the operation of the input/output processing unit 1001. Since the decode-processing of the compressed video data in an MPEG stream has a high computational complexity and involves a variety of processes, the decode processing unit 1002 includes a sequential processing unit 1003 and a routine processing unit 1004 that share the processing load of the decode processing unit 1002. The sequential processing unit 1003 performs header analysis processing on the macroblock headers of the compressed video data, while the routine processing unit 1004 performs the decoding of the compressed video data that is the actual data content of the macroblocks. In the decode processing unit 1002, each macroblock of compressed video data is subjected to processing by the sequential processing unit 1003 and the routine processing unit 1004 once.

The following is a description of the relationship between the compressed video data in an MPEG stream and the macroblocks.

Figure 3:
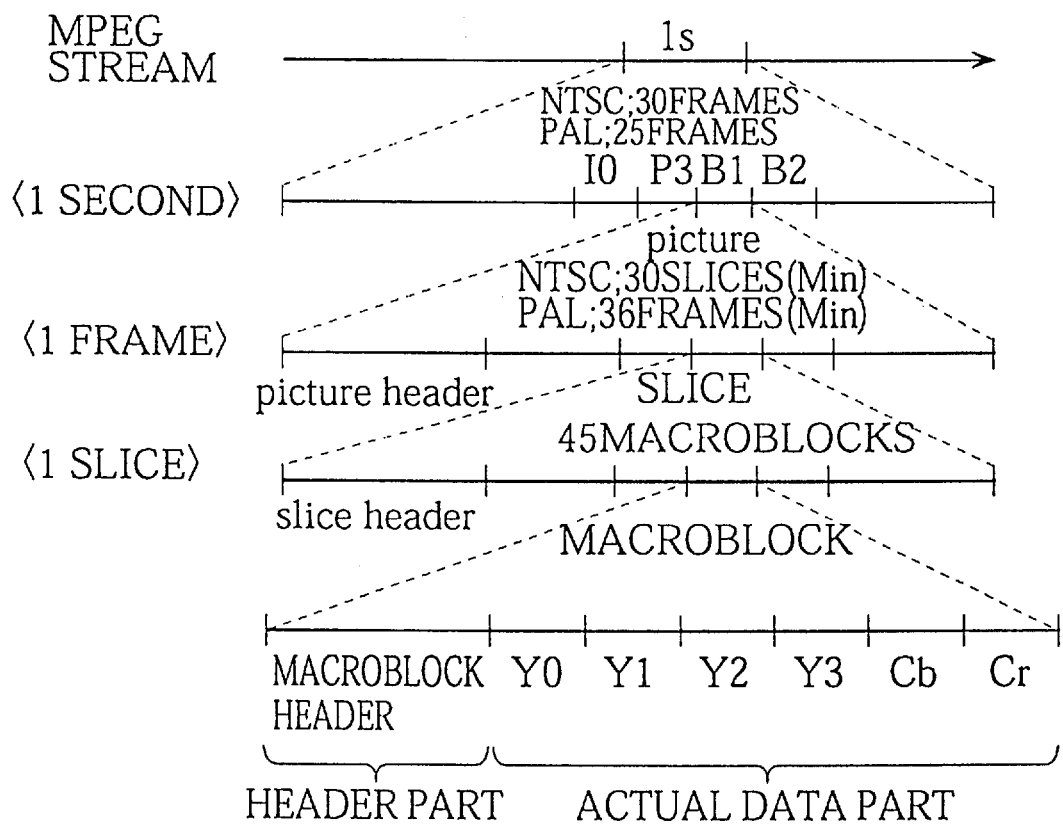
FIG. 3 shows macroblocks as part of the hierarchical construction of an MPEG stream.

FIG. 3 is a representation of a hierarchical structure that shows the relationship between an MPEG stream and macroblocks. The first level in the hierarchy shows the flow of the MPEG stream, while the second level shows a one-second segment of the MPEG stream. This one-second segment includes a plurality of frames that are I-(Intra), P-(Predicative), or B-(Bidirectionally Predicative) pictures.

The third level in the hierarchy shows one of the frames. Each frame includes a picture header and a plurality of slices. The fourth level in the hierarchy shows one of the slices. Each slice includes a slice header and a plurality of macroblocks. The fifth level shows one of the macroblocks. Each macroblock includes a macroblock header and six blocks. These six blocks are composed of four luminance blocks and two chrominance blocks, with each block being an image composed of 8*8 pixels. These six blocks correspond to the data content of the macroblock.

The data construction of the first to fifth levels in FIG. 3 has been described in detail in many well-known publications, such as *Pointo Zukaishiki Saishin MPEG Kyokasho* (*Latest MPEG techniques—An Illustrated Reader*) published by ASCII Publishing, Co.

The decode processing for compressed audio data (hereinafter referred to as "audio decoding") requires comparatively less processing than the decode processing for compressed video data. Accordingly, the sequential processing unit 1003 performs the audio decode processing in the period between the header analysis processing for one macroblock and the header analysis processing for the following macroblock.

As described above, the sequential processing unit 1003 performs both the header decode processing and the audio decode processing. The sequential processing unit 1003 executes these two processes sequentially by executing a program that includes the requisite operations, and gives priority to the header decode processing. These processes are collectively referred to hereinafter as the "sequential processing".

The routine processing unit 1004 performs the decode processing for the data content of the macroblocks. This processing is performed routinely for one macroblock at a time and involves a considerable amount of computation for various processes. This processing is hereinafter referred to as the "routine processing".

1.2.1 The Sequential Processing Unit

The sequential processing unit 1003 includes a processor and a memory. The processor performs the audio decode processing and header analysis processing, the latter being prioritized, by executing thread programs (hereinafter "threads") that are stored in the memory. In the sequential processing unit 1003, an OS (Operating System) controls the execution of audio decode processing and header analysis processing so that the latter is given priority. In this specification, the term "thread" refers to a modular program that is executed in a multi-thread architecture.

The header analysis processing includes the analysis of the header information of a macroblock and the calculation of motion vectors. The header of a macroblock includes information (header information) that is required for the decoding of the data content of the macroblock. The sequential processing unit 1003 transfers the information obtained through the analysis of a macroblock header to the routine processing unit 1004. The motion vectors referred to here are vectors that indicate an 8*8 pixel rectangular region in a reference frame, and so show which rectangular region in the reference frame was used to when the difference values given in the present block were calculated.

The audio decode processing is composed of the analysis of the header of the compressed audio data and the decoding of the data content of the compressed audio data. These processes are performed independently by the sequential processing unit 1003. This means that the audio decode processing can be temporarily stopped and restarted more easily than the header analysis processing. The audio decode processing also has a low computational complexity and so can be performed within the time interval between the header analysis processing of consecutive macroblock headers. For this reason, the sequential processing unit 1003 is constructed to give priority to the header analysis processing over the audio decode processing.

In more detail, when the header analysis processing can be executed, the OS performs control so that the header analysis processing is definitely performed. If the sequential processing unit 1003 is performing the audio decode processing at such time, the OS has the sequential processing unit 1003 suspend the audio decode processing and execute the header analysis processing.

1.2.2 The Routine Processing Unit

The routine processing unit 1004 performs a Variable Length Code Decoding (VLD) process, an Inverse Quantization (IQ) process, an Inverse Discrete Cosine Transform (IDCT) process, and a Motion Compensation (MC) process on the data content of a macroblock as the routine processing. The routine processing unit 1004 performs these processes in the stated order using a pipeline architecture. The routine processing unit 1004 performs the VLD processing on the macroblock header as well as on the data content of the macroblock, and outputs the data obtained by the VLD processing on the macroblock header to the sequential processing unit 1003.

When performing motion compensation, the routine processing unit 1004 stores the decoded blocks in the external memory 3, which serves as the frame memory, via the memory controller 6.

2 The Structure of the Media Processing Apparatus

Figure 4:
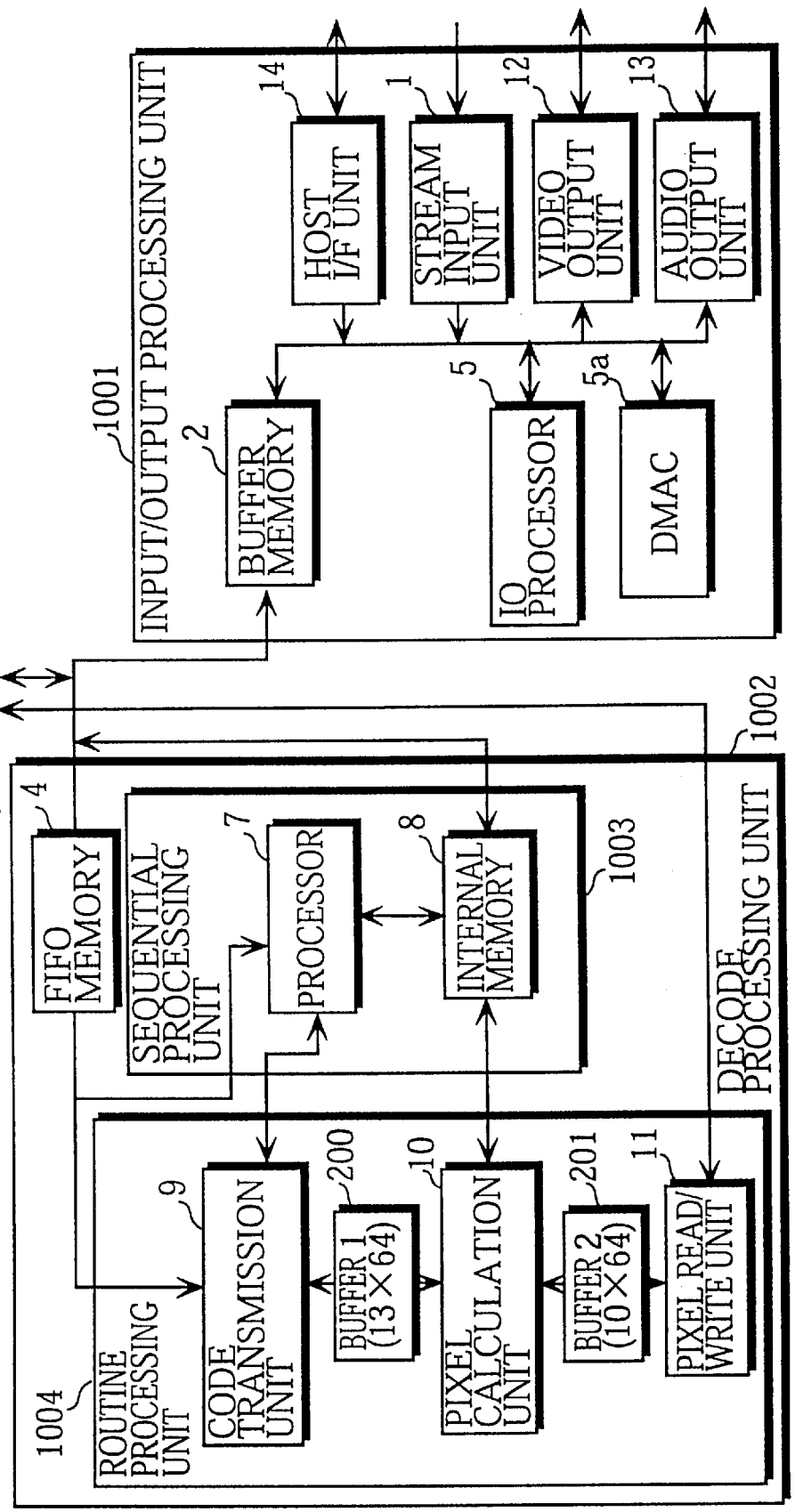
FIG. 4 is a block diagram showing the construction of the media processing apparatus in more detail.

FIG. 4 is a block diagram showing the detailed structure of the media processing apparatus 1000.

2.1 The Structure of the Input/Output Processing Unit

As shown in FIG. 4, the input/output processing unit 1001 is composed of a stream input unit 1, a buffer memory 2, an input/output processor 5 (the "I/O processor 5", hereinafter), a DMAC (Direct Memory Access Controller) 5a, a video output unit 12, an audio output unit 13, and a host interface unit 14.

The stream input unit 1 converts MPEG data streams sequentially inputted from outside into parallel data (referred to "MPEG data" hereinafter). When doing so, the stream input unit 1 detects a start code of a GOP (Group of Pictures) from an MPEG data stream, and informs the I/O processor 5 of such. The GOPs referred to here each include one I-picture and correspond to an MPEG data stream equivalent to video data with a reproduction time of about 0.5 seconds. When informed by the stream input unit 1 that a GOP has been detected, the I/O processor 5 has the converted MPEG data transferred to the buffer memory 2.

The buffer memory 2 temporarily stores the MPEG data transmitted from the stream input unit 1. The MPEG data stored in the buffer memory 2 is then transferred to the external memory 3 via the memory controller 6 according to control by the I/O processor 5.

The external memory 3, which is composed of SDRAM (Synchronous Dynamic Random Access Memory) chips, temporarily stores the MPEG data transmitted from the buffer memory 2 via the memory controller 6. In addition, the external memory 3 stores the decoded video data (also referred to as "frame data" hereinafter) and the decoded audio data.

The I/O processor 5 controls data inputs/outputs between the stream input unit 1, the buffer memory 2, the external memory 3 (linked via the memory controller 6), and a FIFO memory 4. In detail, the I/O processor 5 controls data transfers (DMA transfers) on the following paths (1) to (4):

(1) the stream input unit 1→the buffer memory 2→the memory controller 6→the external memory 3;

(2) the external memory 3→the memory controller 6→the FIFO memory 4;

(3) the external memory 3→the memory controller 6→the buffer memory 2→the video output unit 12; and (4) the external memory 3→the memory controller 6→the buffer memory 2→the audio output unit 13.

The I/O processor 5 separately controls the transfers of video data and audio data included in the MPEG data on the paths given above. The paths (1) and (2) are used for the transfer of the MPEG data which is yet to be decoded. The I/O processor 5 separately transfers the compressed video data and the compressed audio data on the paths (1) and (2). The path (3) is used for the decoded video data, and the path (4) for the decoded audio data. Here, the decoded video data and the decoded audio data are respectively transferred to the external display device (not illustrated) and the external output device (not illustrated) in accordance with the respective output rates for these devices.

The DMAC 5a executes the following transfers in accordance with control by the I/O processor 5: DMA transfer between the buffer memory 2 and each of the stream input unit 1, the video output unit 12, and the audio output unit 13; DMA transfer between the buffer memory 2 and the external memory 3; and DMA transfer between the external memory 3 and the FIFO memory 4.

The video output unit 12 requests the I/O processor 5 to output data in accordance with the output rate (a cycle of the horizontal synchronization signal Hsync, for example) of the external display device (such as a CRT (Cathode-Ray Tube)), and then outputs the video data inputted by the I/O processor 5 on the path (3) to the display device.

The audio output unit 13 requests the I/O processor 5 to output data in accordance with the output rate of the external audio output device, and then outputs the audio data inputted by the I/O processor 5 on the path (4) to the audio output device (such as a D/A (digital-to-analog) converter, an audio amplifier, and a pair of speakers).

The host interface unit 14 is an interface used for communication with an external host processor, such as a processor which performs the overall control in the case where the media processing apparatus is provided in a DVD reproduction device. In this communication, the host processor sends instructions, such as decoding start, stop, fast-forward search, and reverse reproduction, that relate to the decoding of MPEG streams.

2.2 The Structure of the Decode Processing Unit

The decode processing unit 1002 shown in FIG. 4 includes the FIFO memory 4, the sequential processing unit 1003, and the routine processing unit 1004. The decode processing unit 1002 performs the decode processing on the MPEG data supplied by the input/output processing unit 1001 via the FIFO memory 4. The sequential processing unit 1003 includes a processor 7 and an internal memory 8. The routine processing unit 1004 includes a code translation unit 9, a pixel calculation unit 10, a pixel read/write unit 11, a buffer 200, and a buffer 201.

The FIFO memory 4 includes two FIFOs (referred to as the "video FIFO" and the "audio FIFO" hereinafter), and stores the compressed video data and the compressed audio data transferred from the external memory 3 according to control by the I/O processor 5 in a FIFO (first-in first-out) format.

2.2.1 The Sequential Processing Unit

The processor 7 executes the OS stored in the internal memory 8, and switches between executing a program for the header analysis processing and a program for the audio decode processing, according to control performed by the OS. Both of these programs are stored in the internal memory 8. The header analysis processing and audio decode processing are described in detail below.

2.2.1.1 Header Analysis Processing

Figure 5:
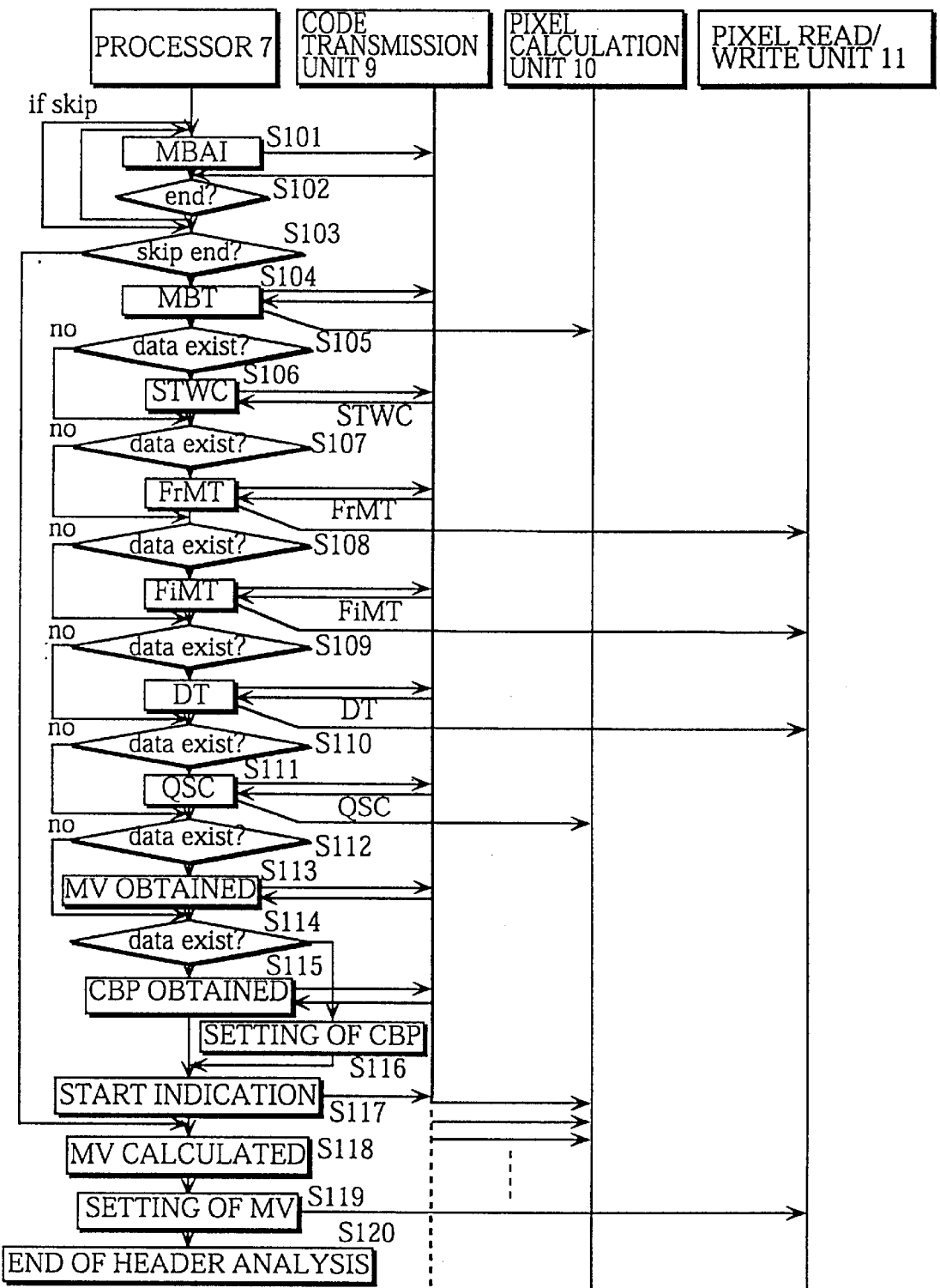
FIG. 5 shows the details of the header analysis processing executed by the processor 7 and the control of the other components in the media processing apparatus performed by the processor 7.

FIG. 5 shows the details of the header analysis processing of the processor 7 and how the processor 7 controls the other components. It should be noted that each set of data in the macroblock header that has been shown in abbreviated form in FIG. 5 is explained in the publication cited above, and so will not be described in this specification.

The processor 7 issues commands to the code translation unit 9 and successively obtains the data that results from the VLD processing on the header. In accordance with the obtained data, the processor 7 then sets various kinds of data in the code translation unit 9, the pixel calculation unit 10, and the pixel read/write unit 11 in order to have the macroblock decoded.

In FIG. 5, the processor 7 issues a command to the code translation unit 9 to obtain an MBAI (MacroBlock Address Increment) (step S101), and so obtains the MBAI from the code translation unit 9. Based on this MBAI, if the present macroblock is a skipped macroblock (which is to say, if the macroblock that is presently to be decoded is the same as the corresponding macroblock in the preceding frame), the present macroblock will have been omitted and the processor 7 will proceed to step S118. If the present macroblock is not a skipped macroblock, the processor 7 will proceed with the header analysis (step S102, S103).

Following this, the processor 7 issues a command to obtain the MBT (MacroBlock Type), and obtains the MBT from the code translation unit 9. The processor 7 uses this MBT to judge whether the scan type of the blocks in the macroblock is zigzag scan or alternate scan, and informs the pixel calculation unit 10 of the correct read order for the buffer 200 (step S104).

The processor 7 then judges from the obtained data in the header whether an STWC (Spatial Temporal Weight Code) exists (step S105), and if so, issues a command to obtain the STWC (step S106).

In the same way, the processor 7 obtains the FrMT (Frame Motion Type), FiMT (Field Motion Type), DT (DCT Type), QSC (Quantifier Scale Code), MV (Motion Vector) and CBP (Coded Block Pattern) (steps S107 to S116).

When doing so, the processor 7 informs the pixel read/write unit 11 of the analysis results of the FrMT, FiMT, and DT, informs the pixel calculation unit 10 of the analysis result of the QSC, and informs the code translation unit 9 of the analysis result of the CBP. By doing so, the information that is necessary for the IQ, ICDT, and MC processing is set in the code translation unit 9, pixel calculation unit 10, and pixel read/write unit 11.

The processor 7 next gives the code translation unit 9 an indication to start the VLD processing of the data content of the macroblock (step S117). On receiving this VLD start indication, the code translation unit 9 starts the VLD processing.

The processor 7 calculates the motion vectors in accordance with the MV data (step S118), and informs the pixel read/write unit 11 of the calculation result (step S119).

The reason the processor 7 issues the VLD start indication (step S117) before performing the processing related to motion vectors is as follows.

In the routine processing unit 1004, pipeline processing is performed in the order code translation unit 9 the pixel calculation unit 10 pixel read/write unit 11. In this pipeline processing, the various components of the routine processing unit 1004 perform processing only after receiving the data produced by the header analysis processing on the macroblock header.

In FIG. 5, when the processing in step S116 has been completed, the pixel read/write unit 11 will not be able to perform its processing since it will not have received the data for the motion vectors, although the code translation unit 9 and pixel calculation unit 10 will have received the necessary data to commence their respective processes.

For this reason, the routine processing is started first, so that the motion vectors may be calculated while the code translation unit 9 and pixel calculation unit 10 are performing their processes. The pixel read/write unit 11 is then informed of the calculation result. This means that in this embodiment, the decode processing for a macroblock can be completed in a shorter time, thereby improving the processing efficiency of the decode processing unit 1002.

Finally, the processor 7 sends a header analysis end signal to the OS (step S120). However, on completing the header analysis processing for all macroblocks in one frame, the processor 7 sends a frame end signal to the OS in place of the header analysis end signal. By sending this signal, the processor 7 completes the header analysis for the compressed video data in one macroblock.

2.2.1.2 Audio Decode Processing

In the audio decode processing, the processor 7 analyzes the header part and the data part of the compressed audio data read from the FIFO memory 4, performs a decoding process, and downmixes the decoding result for audio channels. The processor 7 then outputs the audio data obtained by this series of processes to the external memory 3 via the memory controller 6.

2.2.2 The Routine Processing Unit

Figure 6:
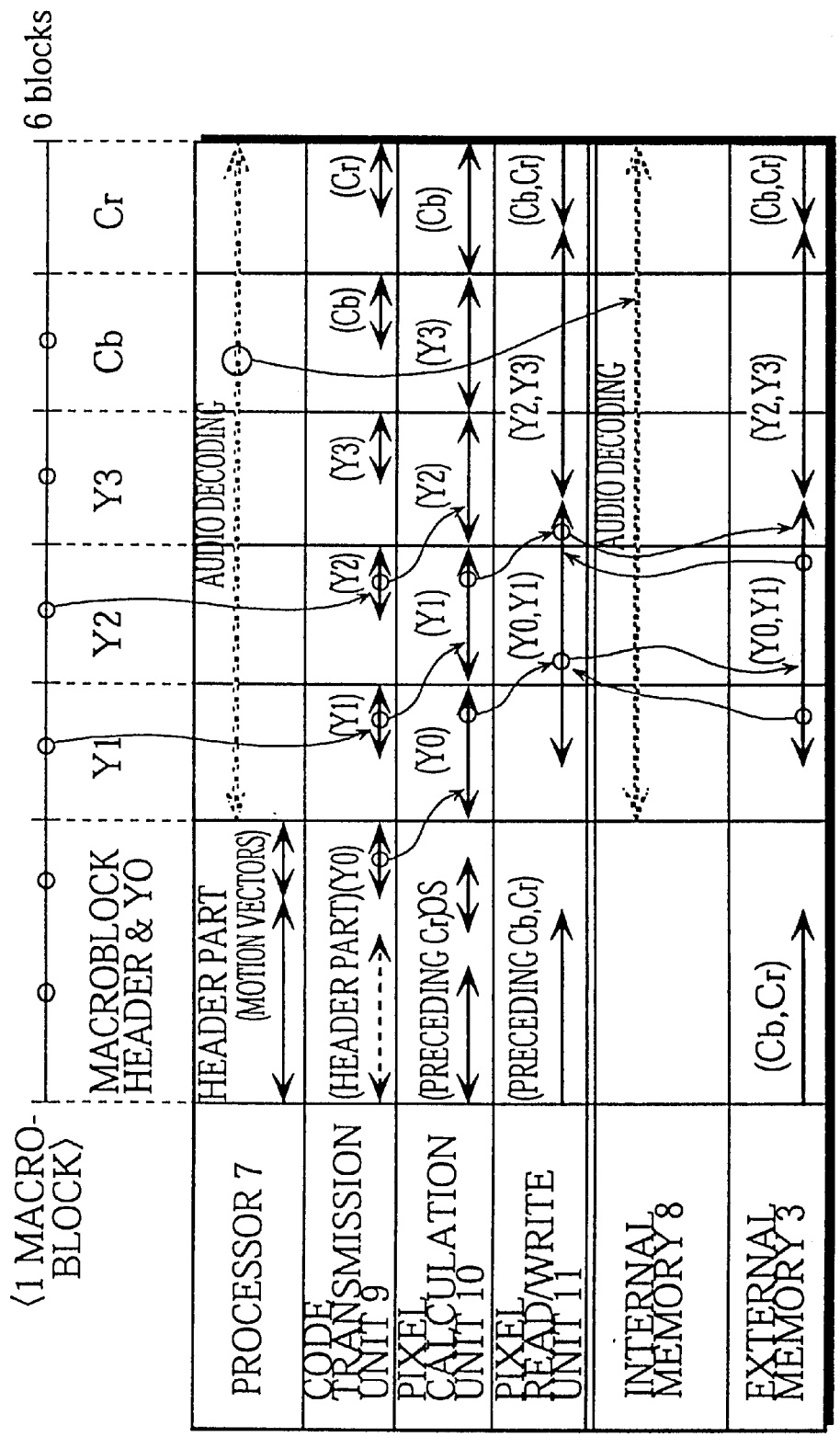
FIG. 6 shows the operation timing of the various components of the decode processing unit 1002, with the horizontal axis representing time.

FIG. 6 shows the operation timing of the various components of the decode processing unit 1002. In FIG. 6, the horizontal axis represents time.

The code translation unit 9 performs a VLD on the compressed video data read from the FIFO memory 4. As shown in this figure, the code translation unit 9 transfers the header part (shown by the broken line in FIG. 6), to the processor 7, and transfers the macroblock data (the six blocks shown by the solid lines that are composed of the luminance blocks Y0 to Y3, and the chrominance blocks Cb,Cr) to the pixel calculation unit 10 via the buffer 200. After the decoding performed by the code translation unit 9, the macroblock data is data that shows the spatial frequency components.

During the VLD processing of the header part, the code translation unit 9 operates in parallel with the header analysis processing of the processor 7. On receiving a command requesting various kinds of data from the processor 7, the code translation unit 9 outputs the requested data to the processor 7. On completing the VLD for one macroblock, the code translation unit 9 outputs a VLD end signal to the processor 7.

The buffer 200 stores data showing the spatial frequency components for one block (8 by 8 pixels) that has been entered by the code translation unit 9.

The pixel calculation unit 10 performs the IQ and IDCT processing on the block data transferred from the code translation unit 9 via buffer 200 in units of blocks. The processing result given by the pixel calculation unit 10, i.e., data representing pixel luminance values or differences in the case of a luminance block and data representing pixel chrominance values or differences in the case of a chrominance block, is transferred to the pixel read/write unit 11 via the buffer 201.

The buffer 201 stores pixel data of one block (8 by 8 pixels).

The pixel read/write unit 11 performs the MC processing on the processing result given by the pixel calculation unit 10 in units of blocks. More specifically, for P-pictures or B-pictures, the pixel read/write unit 11 extracts a rectangular area indicated by the motion vector from the decoded reference frame in the external memory 3 via the memory controller 6 and blends the extracted rectangular area with the block that has been processed by the pixel calculation unit 10 to obtain an original block image. This decoding result of the pixel read/write unit 11 is stored in the external memory 3 via the memory controller 6.

3. Operation Timing of the Components

The following is a description of the operation timing of the various components of the sequential processing unit 1003 and the routine processing unit 1004 described above.

Figure 7:
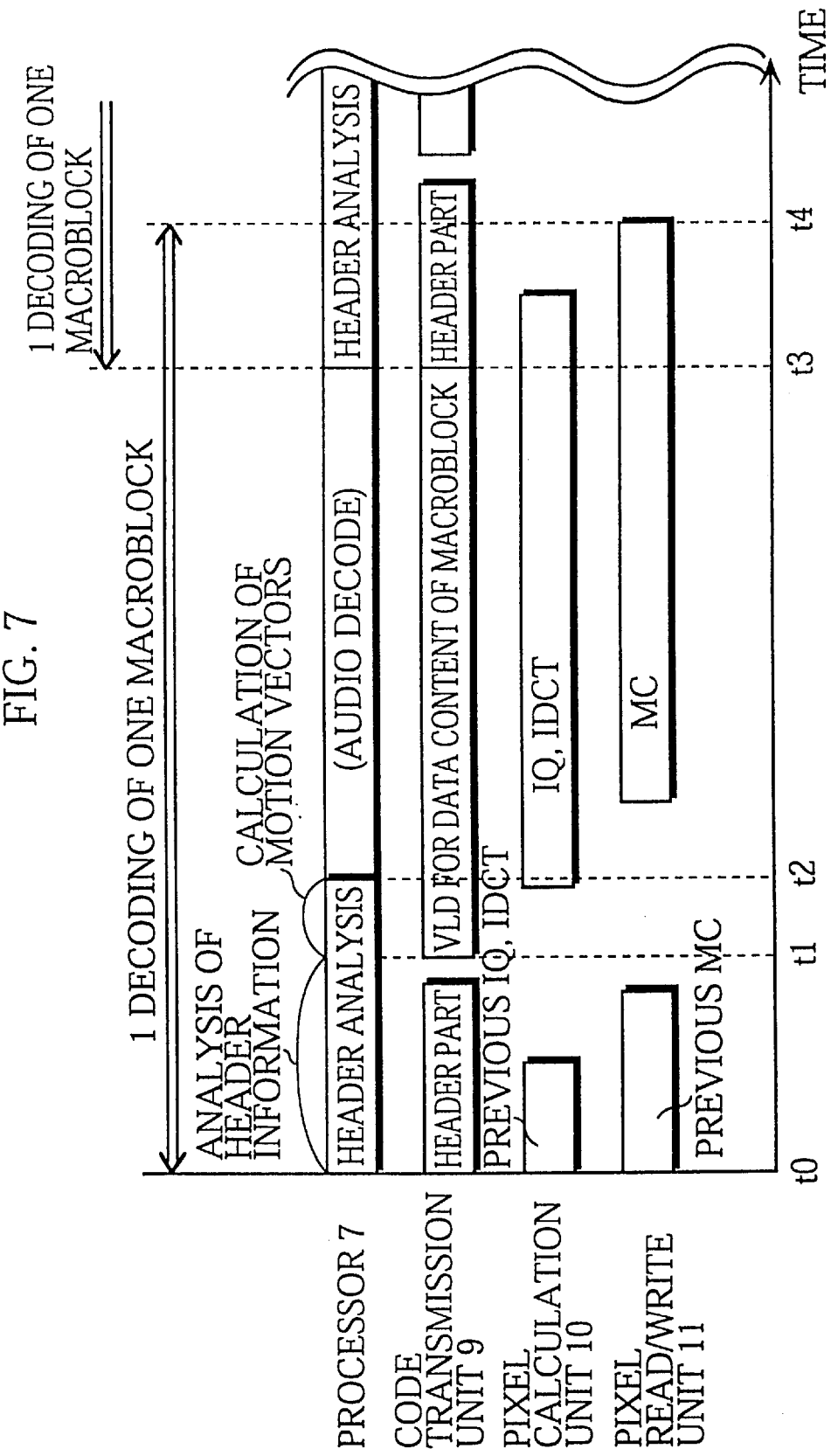
FIG. 7 is a timing chart showing the operation timing of the major components of the decode processing unit.

FIG. 7 is a timing chart showing the operation timing of the major components of the decode processing unit 1002. Note that the horizontal axis in FIG. 7 represents time, with t0~t4 representing different points (times) on the time axis.

In FIG. 7, the processor 7 first performs the header analysis processing for one macroblock (composed of the analysis of the header information and calculation of the motion vectors) (t0~t2).

When doing so, the processor 7 completes the analysis of the header information (t1) and, before starting to calculate the motion vectors, outputs a VLD start indication for the data content of the macroblock to the code translation unit 9. After completing the entire header analysis processing (that is to say, after completing the calculation of the motion vectors), the processor 7 commences the audio decode processing (t2). When the code translation unit 9 has completed the VLD for the data content of the macroblock (t3), the processor 7 suspends the audio decode processing and commences the header analysis processing for the next macroblock.

On completing the header analysis for a first macroblock, the processor 7 performs the audio decode processing instead of the header analysis for the next macroblock. This is for the following reason. When performing the header analysis, the processor 7 needs to issue a command to the code translation unit 9 for information for the header part that is produced by the VLD processing of the code translation unit 9. As a result, when the processor 7 performs the header analysis, the code translation unit 9 needs to be able to perform the VLD processing on the header part. When the processor 7 has completed the header analysis processing, however, the code translation unit 9 will be performing the VLD processing on the data content of the macroblock and so will not be able to perform the VLD processing on the next header part.

The code translation unit 9 performs the VLD processing on the macroblock header in parallel with the header analysis processing performed by the processor 7 (t0). Next, the code translation unit 9 receives the VLD start indication from the processor 7 and commences the VLD processing on the data content of the macroblock (t1). On completing the VLD processing for the data content of the macroblock, the code translation unit 9 outputs a VLD end signal to the sequential processing unit 1003. As a result, the processor 7 suspends the audio decode processing and commences the header analysis processing of the next macroblock header (t3).

The pixel calculation unit 10 and pixel read/write unit 11 respectively perform the processes described below following the processes of the code translation unit 9 and the pixel calculation unit 10 in a pipeline architecture.

As shown by the process timing described above, the processor 7 gives priority to the execution of the header analysis, so that each component of the routine processing unit 1004 can receive the various kinds of data required to decode a macroblock and can process the macroblock without delay. By operating in a pipeline architecture, each component of the routine processing unit 1004 can process at high speed. The processor 7 uses the interval between the header analysis of one macroblock and the header analysis of the next macroblock to perform the audio decode processing. This reduces the idle time of the processor 7 and so improves the overall processing efficiency.

During the header analysis processing, the processor 7 outputs a VLD start indication for the data content of the macroblock to the code translation unit 9 on completing the analysis of the header information (t1). This brings the VLD start timing forward, meaning that the time taken to decode one entire macroblock can be reduced by the time the VLD start time is brought forward.

4. OS (Operating System) of the Routine Processing Unit

The processor 7 runs an OS to have the various processes efficiently executed with the process timing described above. The OS detects interrupt signals such as the signals outputted at the end of the header analysis processing or at the end of the VLD processing for the data content of a macroblock, and switches between the header analysis and the audio decode processing based on these signals. As mentioned earlier, the header analysis processing is given priority.

Figure 8:
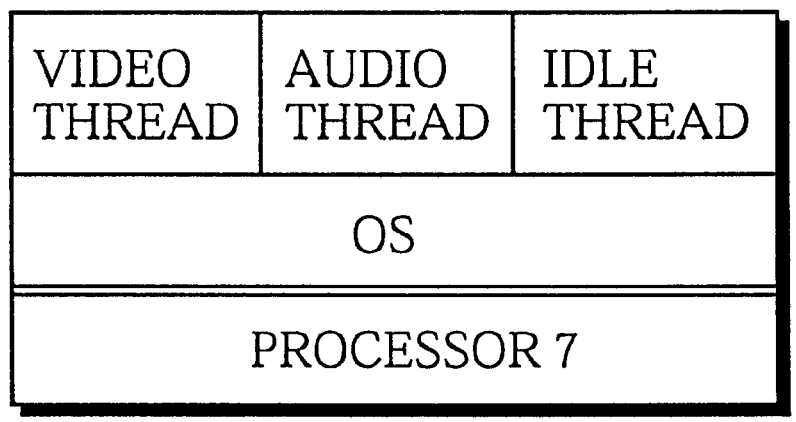
FIG. 8 shows the software configuration of the processor 7.

FIG. 8 shows the software configuration of the processor 7.

In FIG. 8, the video thread is a thread that has the processor 7 execute the header analysis processing. The audio thread is a thread that has the processor 7 execute the audio decode processing. The idle thread is a thread that is executed by the processor 7 to make the processor idle when not executing the header analysis processing or the audio decode processing.

The OS is positioned between the processor 7 and the threads, and manages the states of the threads which change due to interrupts. Each thread is in one of three possible states: an execute state; a wait state, and a ready state. Based on the changes in the states of the threads, the OS assigns one of the threads to the processor 7 while giving priority to the video thread. When an error has occurred in either the header analysis processing or the routine processing, the OS performs error processing.

4.1 Interrupt Signals

FIG. 9 is a table showing the various interrupt signals detected by the OS. The second column in FIG. 9 shows the various kinds of interrupt signals. The third column shows the component that outputs each particular kind of interrupt signal. The fourth column shows the causes of the various kinds of interrupt signals. Note the first column in this table includes identification numbers that have been assigned to each kind of interrupt to simplify the following explanation.

① The header analysis end signal is a signal that the processor 7 outputs on completing the header analysis processing for one macroblock.

② The frame end signal is a signal that the processor 7 outputs in place of the ① header analysis end signal on completing the header analysis processing for the final macroblock in a frame.

③ The VLD busy signal is a signal that the code translation unit 9 outputs. Normally, on receiving a command issued by the processor 7, the code translation unit 9 will transmit data to the processor 7. However, when the code translation unit 9 has not completed the VLD processing of the requested data, it outputs a VLD busy signal in place of the data.

④ The VLD end signal is a signal that the code translation unit 9 outputs on completing the VLD processing for one macroblock.

⑤ The vertical synch signal is a signal that the media processing apparatus 1000 receives from outside. This signal is used to align the cycle for decoding the macroblocks in one frame with the vertical synch signal.

⑥ The VLD ready signal is a signal that the code translation unit 9 outputs after outputting ③ the VLD busy signal to show that it has completed the VLD processing on the present data.

⑦ The audio data busy signal is a signal that the FIFO memory 4 outputs when the FIFO memory 4 has been instructed by the processor 7 to output compressed audio data but is yet to receive the corresponding compressed audio data from the external memory 3.

⑧ The audio data ready signal is signal that the FIFO memory 4 outputs after outputting the ⑦ audio data busy signal on receiving the corresponding compressed audio data from the external memory 3.

⑨ The VLD error signal is a signal that the code translation unit 9 outputs when an error occurs in the VLD processing.

⑩ The motion compensation error signal is a signal that the pixel read/write unit 11 outputs when an error occurs in the motion compensation processing.

4.2 State Transition of Threads

The states of the video thread and audio thread change as described below when the interrupt signals ① to ⑧ shown in FIG. 9 are generated.

4.2.1 Video Thread

Figure 10:
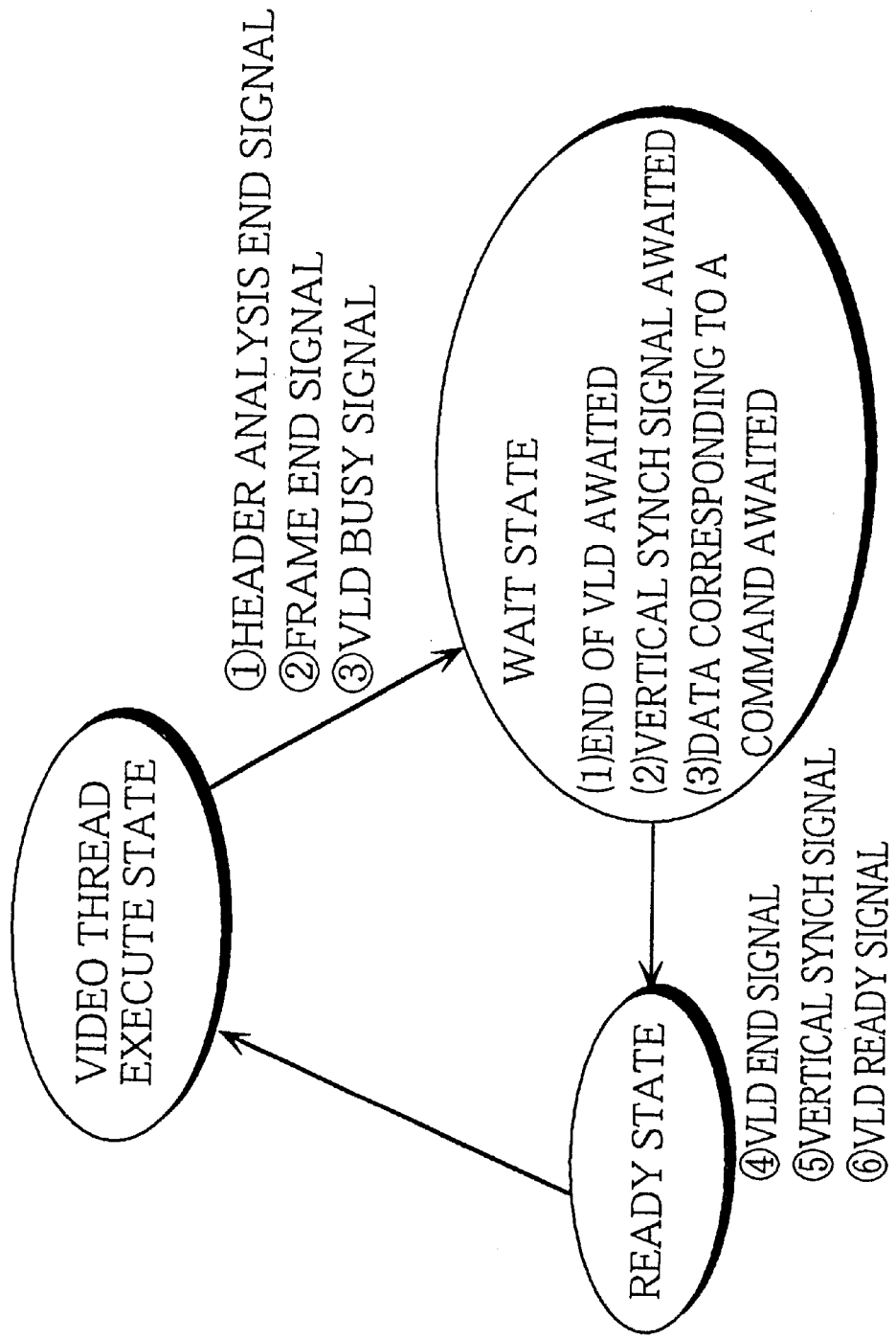
FIG. 10 shows the state transition of the video thread.

FIG. 10 shows the state transition of the video thread. The interrupt signals ①~③ and ④~⑥ written next to the arrows in FIG. 10 show the interrupt signals that cause the transitions shown by the arrows. The legends given as (1) to (3) in the wait state oval show specific causes of waits. These causes (1) to (3) respectively correspond to interrupt signals ①~③ and to interrupt signals ④~⑥.

In detail, when the processor 7 has completed the header analysis of one macroblock (marked by the ① header analysis end signal), the video thread changes from the execute state to the wait state. The end of the VLD processing of the data content of the macroblock by the code translation unit 9 is awaited (legend (1)), and when the VLD processing has ended (marked by the ④ VLD end signal), the video thread moves from the wait state to the ready state.

In the same way, when the processor 7 has completed the header analysis of all macroblocks in one frame (marked by the ② frame end signal), the video thread changes from the execute state to the wait state. The input of a vertical synch signal from outside is awaited (legend (2)), and when the vertical synch signal is inputted (marked by the vertical end signal ⑤), the video thread changes from the wait state to the ready state.

When the code translation unit 9 outputs a VLD busy signal (marked by the interrupt signal ③), the video thread changes from the execute state to the wait state and the end of the VLD processing for the data in question is awaited (legend (3)). When the code translation unit 9 outputs the VLD ready signal (marked by the interrupt signal ⑥), the video thread moves from the wait state to the ready state.

4.2.2 Audio Thread

Figures 11, 12:
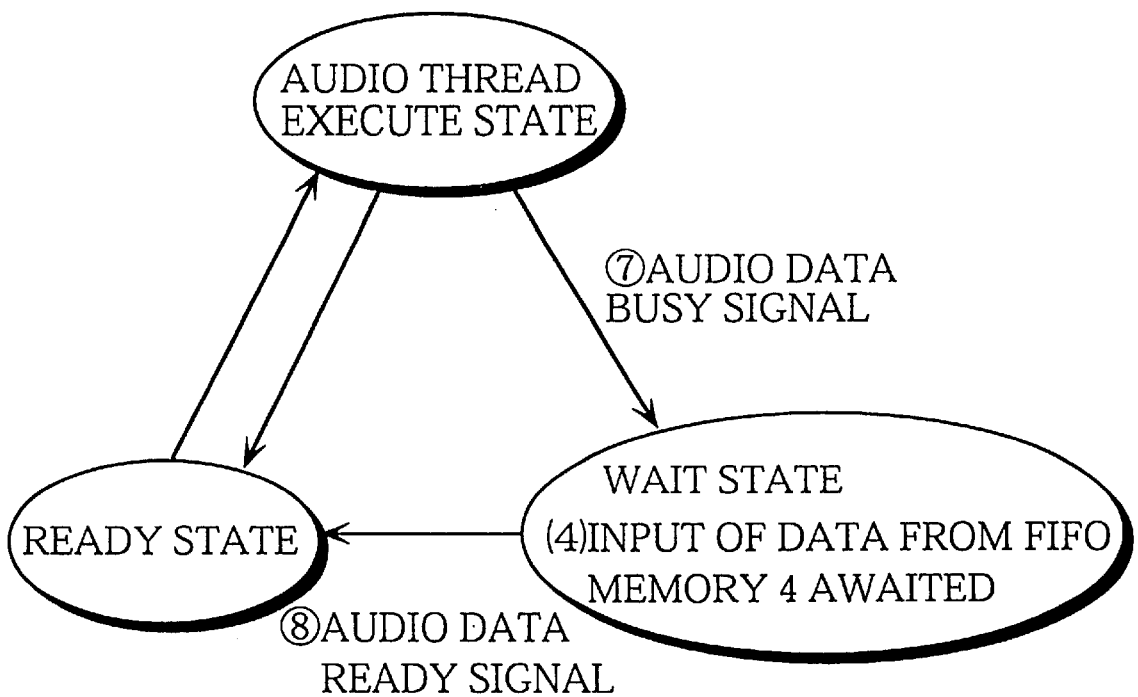
FIG. 11 shows the state transition of the audio thread.
FIG. 12 shows an example state table.

FIG. 11 shows the state transition of the audio thread.

The interrupt signals ⑦, ⑧ written next to the arrows in FIG. 11 show the interrupt signals that cause the transitions shown by the arrows. The interrupt signal ⑦, the wait factor shown as legend (4) and the interrupt signal ⑧ correspond to one another.

In detail, when the FIFO memory 4 outputs an audio data busy signal (marked by the interrupt signal ⑦), the audio thread changes from the execute state to the wait state, and the preparation of data by the FIFO memory 4 is awaited (shown by the legend (4)). When the FIFO memory 4 outputs the audio data ready signal (marked by the interrupt signal ⑧), the audio thread moves from the wait state to the ready state.

4.3 Thread Processing

The OS has a state table where each thread is given along with its present state. When interrupt signals ① to ⑧ are detected, the OS rewrites the content of the state table in accordance with the type of interrupt signal. In this way, the OS manages the state of each thread.

FIG. 12 shows an example of the state table. In FIG. 12, the first column shows the type of thread, while the second column shows the present state of each thread. As one example, when the OS detects the header analysis end signal ①, the OS changes the state of the video thread from "execute" to "wait", as shown in FIG. 10.

The OS rewrites the content of the state table in accordance with the state transition of states according to interrupts, as shown in FIGS. 10 and 11.

4.4 Assignment to the Processor

After rewriting the state table based on interrupts, the OS performs the selection process that selects the thread to be assigned to the processor 7.

Figure 13:
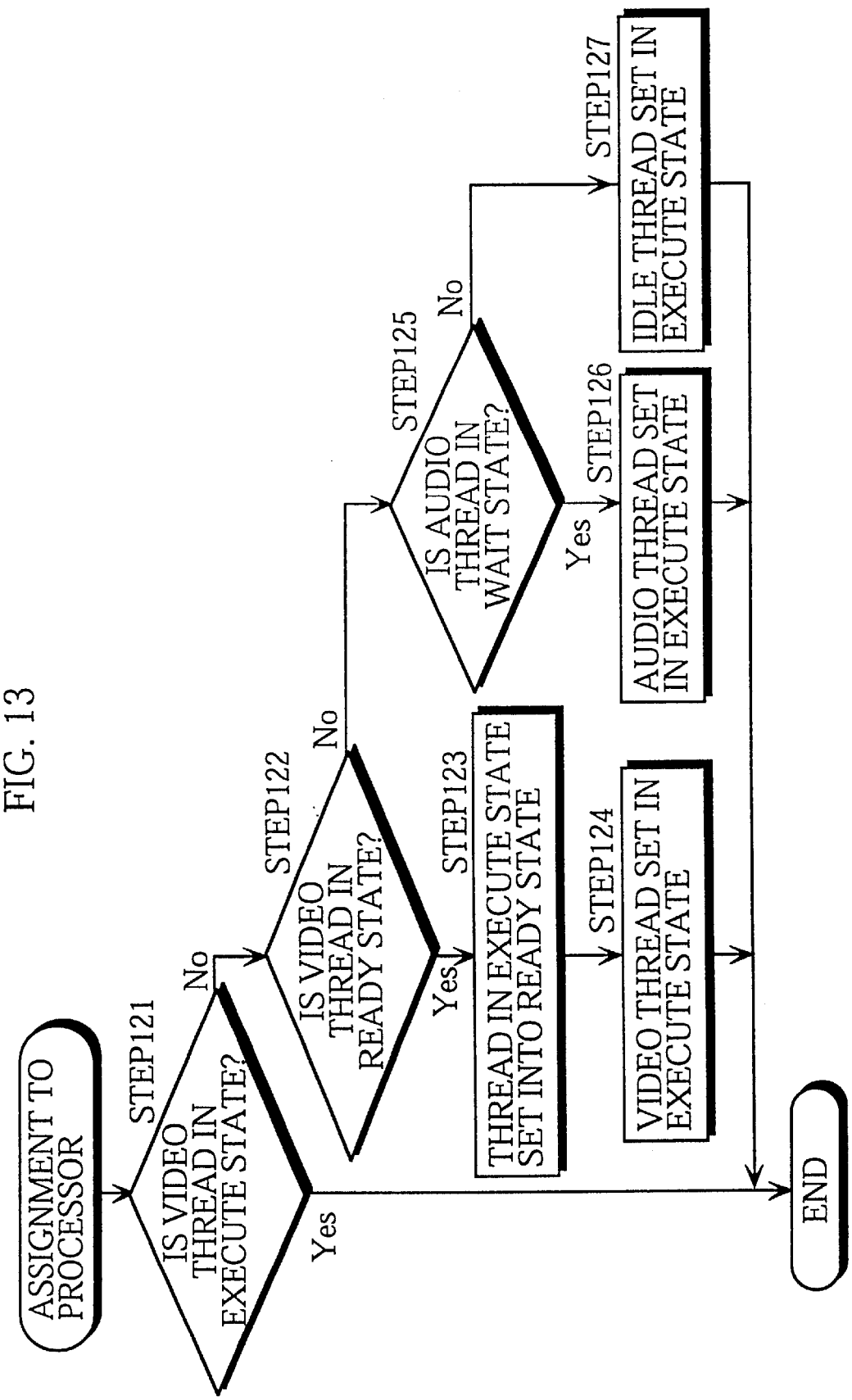
FIG. 13 is a flowchart showing the selection process where the OS selects a thread to be assigned to the processor 7.

FIG. 13 is a flowchart showing the selection process where the OS selects a thread to be assigned to the processor 7.

First, the OS refers to the state table and judges whether the video thread is in the execute state (Step 121). If so, the OS completes the selection process.

When the OS finds that the video thread is not in the execute state in Step 121, the OS next judges whether the video thread is in the ready state (Step 122). If so, the OS changes the state of the audio thread from the execute state to the wait state, and then sets the video thread into the execute state. By doing so, the OS has the processor 7 switch from processing a current thread to processing a video thread (Steps 123, 124).

As described above, on finding that the video thread is in the execute state, the OS completes the selection process. On finding the video thread in the ready state, however, the OS sets the video thread into the execute state to have the video thread executed with priority.

On finding that the video thread is not in the ready state in Step 122, which means that the video thread is in the wait state, the OS judges whether the audio thread is in the ready state (Step 125).

On finding that the audio thread is in the ready state in Step 125, the OS sets the audio thread into the execute state (Step 126).

On finding that the audio thread is not in the ready state in Step 125, which means that both the video thread and the audio thread are in the wait state, the OS has the processor 7 execute a program called an idle thread that does not include any processing (Step 127).

4.5 Error Processing

On detecting the ⑨ VLD error signal or the ⑩ motion compensation error signal shown in FIG. 9, the OS has the processor 7 suspend the processing of the thread being executed and performs error processing. In the error processing, the OS outputs a reset signal to the pixel calculation unit 10 and the pixel read/write unit 11 of the routine processing unit 1004. As a result, all of the data relating the decoding of the present macroblock is discarded. On receiving the reset signal inputted at this point, the pixel read/write unit 11 performs a error compensation process. Here, the error compensation process is a process that reads a macroblock in a corresponding position in a preceding frame from the external memory 3 so that a macroblock in the next slice can be decoded.

After outputting the reset signal, the OS rewrites the state table so that the video thread is in the ready state. As a result, the OS will then set the video thread into the execute state by performing the selection process shown in FIG. 13. The processor 7 will then be assigned to the video thread and so will execute the header analysis of a macroblock in the next slice.

5 Operation

The following is a description of the operation of the media processing apparatus 1000 whose construction is described above.

5.1 Operation of the Input/Output Processing Unit

In the input/output processing unit 1001, the input/output processor 5 performs control so that the MPEG streams that are asynchronously inputted from the stream input unit 1 are temporarily stored in the external memory 3 via the buffer memory 2 and the memory controller 6. The inputted MPEG streams are also stored in the FIFO memory 4 via the memory controller 6. Here, the input/output processor 5 supplies compressed video data and compressed audio data in accordance with the amount of data remaining in the FIFO memory 4. In this way, the input/output processor 5 ensures that a constant amount of compressed video data and compressed audio data is present in the FIFO memory 4. This means that data excesses and insufficiencies in the FIFO memory 4 are avoided, and that the decode processing unit 1002 can focus on the decode processing without needing to consider the asynchronous input and output of data. Note that the operation described thusfar is performed by the input/output processing unit 1001 independently of and in parallel with the processing of the decode processing unit 1002.

5.2 Operation of the Decode Processing Unit

The decode processing unit 1002 has the MPEG stream data stored in the FIFO memory 4 decoded by the code translation unit 9, the pixel calculation unit 10, and the pixel read/write unit 11. FIGS. 14A through FIG. 16B show the decode processing from the FIFO memory 4 onwards for the case where no error occurs (the standard operation), the case where a VLD error occurs, and the case where a motion compensation error occurs.

5.2.1 Standard Operation

Figure 14A:
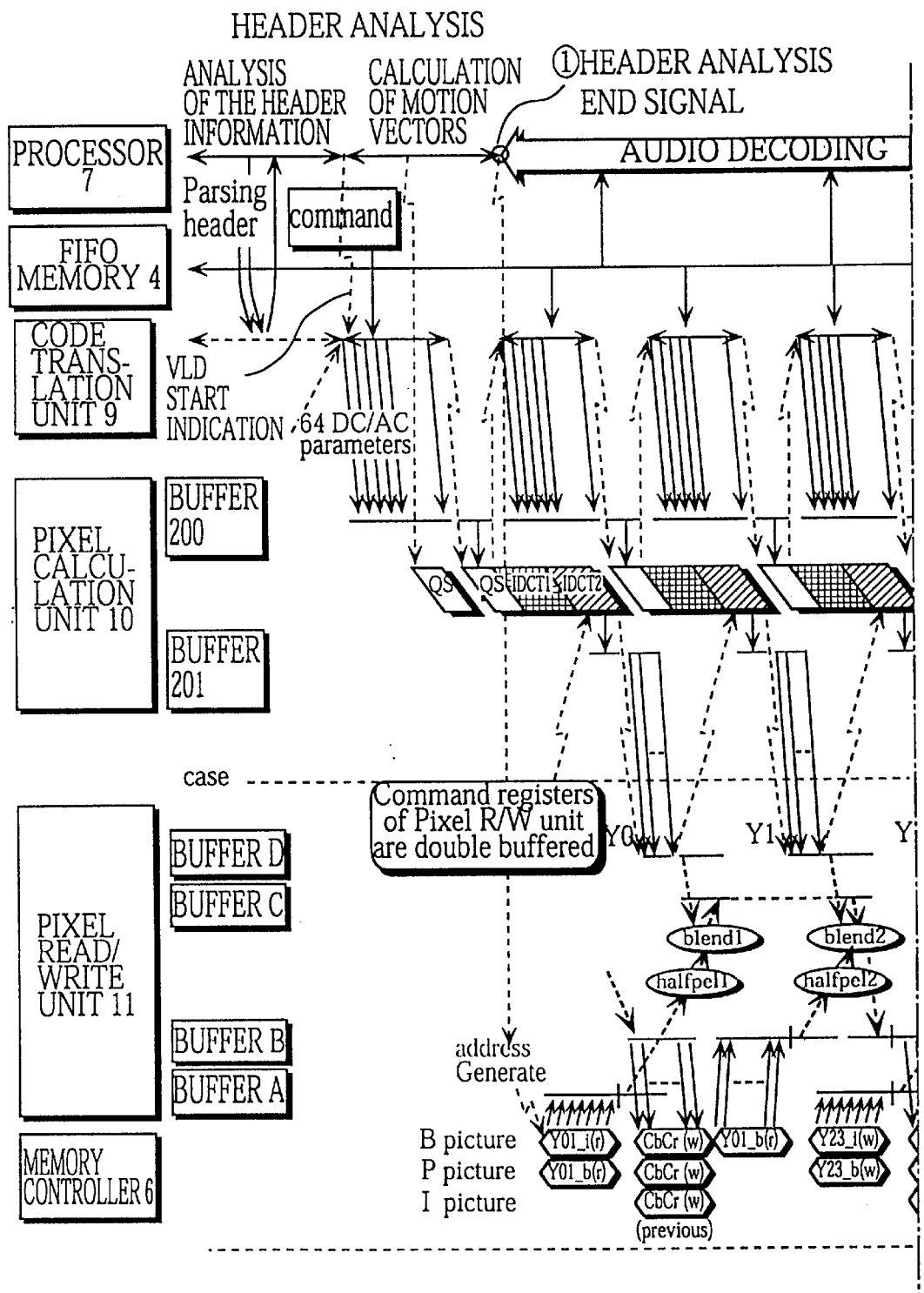
FIGS. 14A and 14B show the detailed operations performed by the various components of the decode processing unit during a decode operation, based on FIG. 7.
Figure 14B:
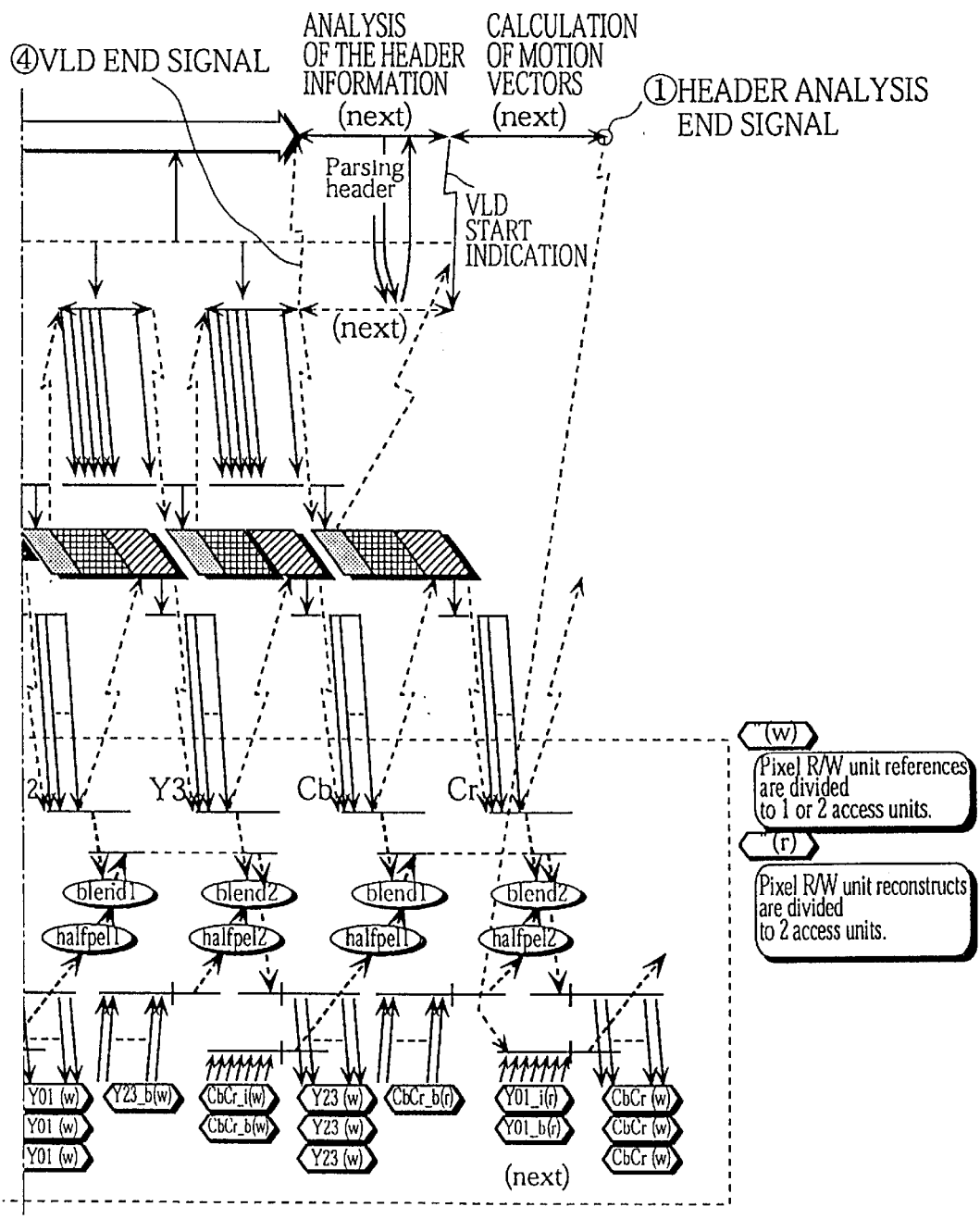

FIGS. 14A and 14B show the detailed operations performed by the various components of the decode processing unit during a decode operation, based on FIG. 7.

As shown in FIGS. 14A and 14B, the processor 7 repeatedly alternates between the header analysis processing performed for the video thread and the audio decode processing performed for the audio thread under the control of the OS. This switching of the operation of the processor 7 is based on the ① header analysis end signal and the ④ VLD end signal.

In detail, the processor 7 performs the header analysis of one macroblock. After informing the code translation unit 9, the pixel calculation unit 10, and the pixel read/write unit 11 of the analysis result, the processor 7 instructs the code translation unit 9 to start the VLD processing of the macroblock. Next, the processor 7 calculates the motion vectors and outputs the calculation result to the pixel read/write unit 11. Finally, the processor 7 outputs the ① header analysis end signal.

On detecting the ① header analysis end signal, the OS performs the selection process shown in FIG. 13 and sets the audio thread in the execute state. This results in the processor 7 starting the audio decode processing. The processor 7 temporarily stores the audio data that results from the decoding into the internal memory 8. The memory controller 6 then subjects this data to a DMA (Direct Memory Access) transfer to the external memory 3.

On detecting the ④ VLD end signal during the audio decode processing, the OS first sets the video thread into the ready state and, by executing the selection process shown in FIG. 13, sets the audio thread into the ready state and the video thread into the execute state. As a result, the processor 7 commences the header analysis of the next macroblock.

On receiving a VLD start indication for a macroblock from the processor 7, the code translation unit 9 executes the VLD processing on the data content of the macroblock and stores the blocks decoded from the macroblock into the buffer 200. On completing the VLD processing, the code translation unit 9 outputs the ④ VLD end signal.

In parallel with the operation of the code translation unit 9, the pixel calculation unit 10 performs the IQ and IDCT processing on each block in the macroblock data stored in the buffer 200, and stores the results in the buffer 201.

In parallel with the processing of the pixel calculation unit 10, the pixel read/write unit 11 cuts out a rectangular region from the reference frame in the external memory 3 and performs block synthesis, as shown in FIGS. 14A and 14B, based on the block data in the buffer 201 and the motion vectors received from the processor 7 during the header analysis processing. The pixel read/write unit 11 then stores the results of the block synthesis into the external memory 3 via the memory controller 6.

The above operation is for the case when a processed macroblock is not a skipped macroblock. When processing a skipped macroblock, neither the code translation unit 9 nor the pixel calculation unit 10 operates, with only the pixel read/write unit 11 being operational. Since a skipped macroblock is the same image as a rectangular region in the reference frame, the pixel read/write unit 11 copies this into the external memory 3 as the decoded image.

In this case, the ④ VLD end signal that is outputted from the code translation unit 9 to the processor 7 is generated according to the following method. A logical AND is calculated for a signal showing that the processor 7 has sent a control signal to the pixel read/write unit 11 to start motion compensation, a signal showing that motion compensation is possible for the pixel read/write unit 11, and a signal showing that the present macroblock is a skipped macroblock. Next, a logical OR is taken for the result of this logical AND and an EOMB (End Of MacroBlock) signal that is attached to the end of a macroblock, and the result is inputted into the processor 7 as the ④ VLD end signal.

5.2.2 Operation for a VLD Error

Figure 15A:
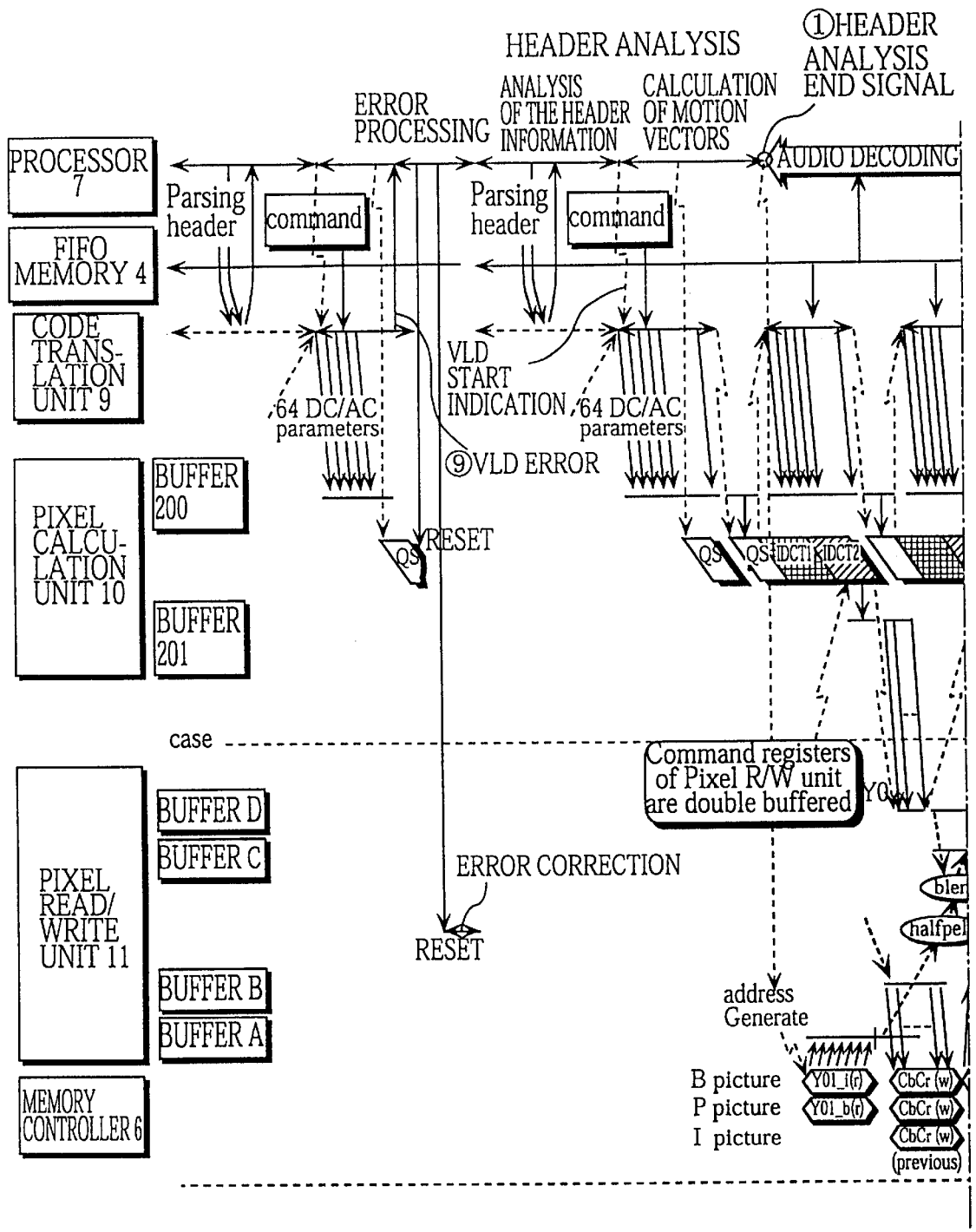
FIGS. 15A and 15B show the operations performed by the code conversion unit 9 when a VLD error has occurred.
Figure 15B:
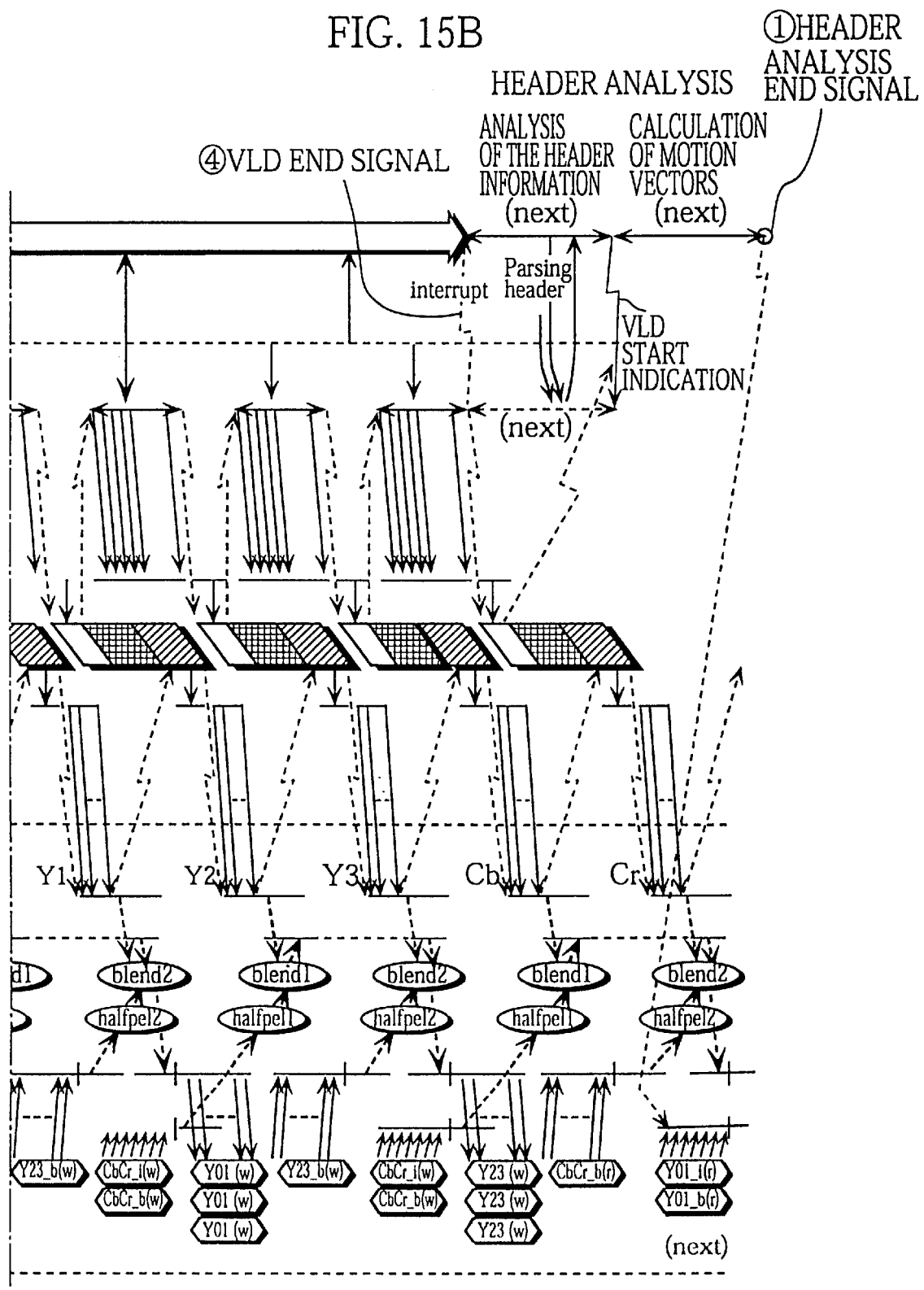

FIGS. 15A and 15B show the operation performed by the code conversion unit 9 when a VLD error has occurred.

As shown in FIGS. 15A and 15B, on detecting a ⑨ VLD error signal outputted by the code translation unit 9 during the header analysis processing of the processor 7, the OS has the error processing performed and so outputs a reset signal to the pixel calculation unit 10 and the pixel read/write unit 11. On receiving this reset signal, the pixel calculation unit 10 and pixel read/write unit 11 discard the data relating to the macroblock being decoded. After the error processing, the OS sets the video thread into the ready state. This means that in the selection process shown in FIG. 13, the OS sets the video thread into the execute state, and so has the processor 7 commence the header analysis of a macroblock in the next slice.

The operation hereinafter is the same as in FIGS. 14A and 14B, and so will not be described.

5.2.3 Operation for a Motion Compensation Error

Figure 16A:
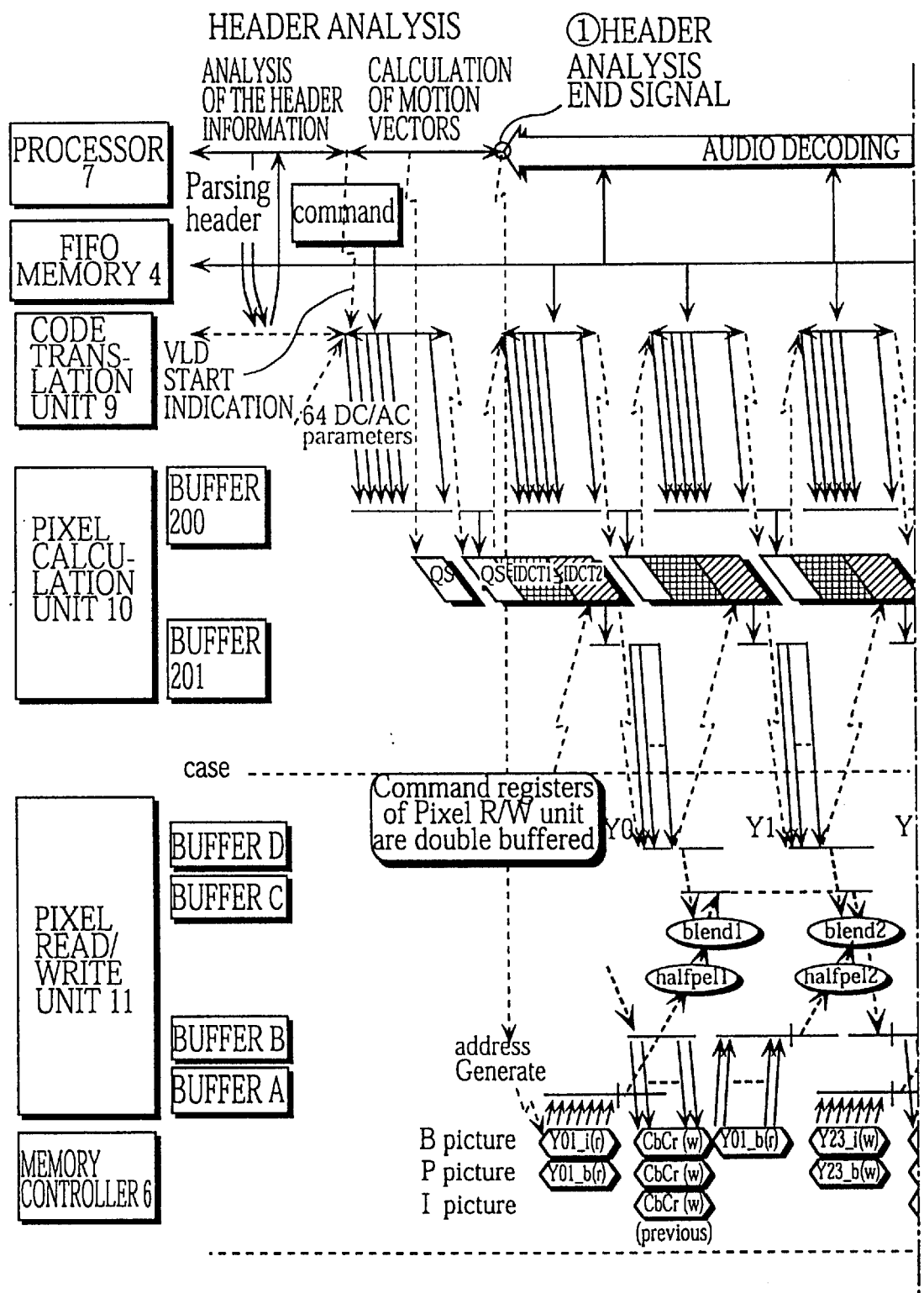
FIGS. 16A and 16B show the operations performed by the pixel read/write unit when a motion compensation error has occurred.
Figure 16B:
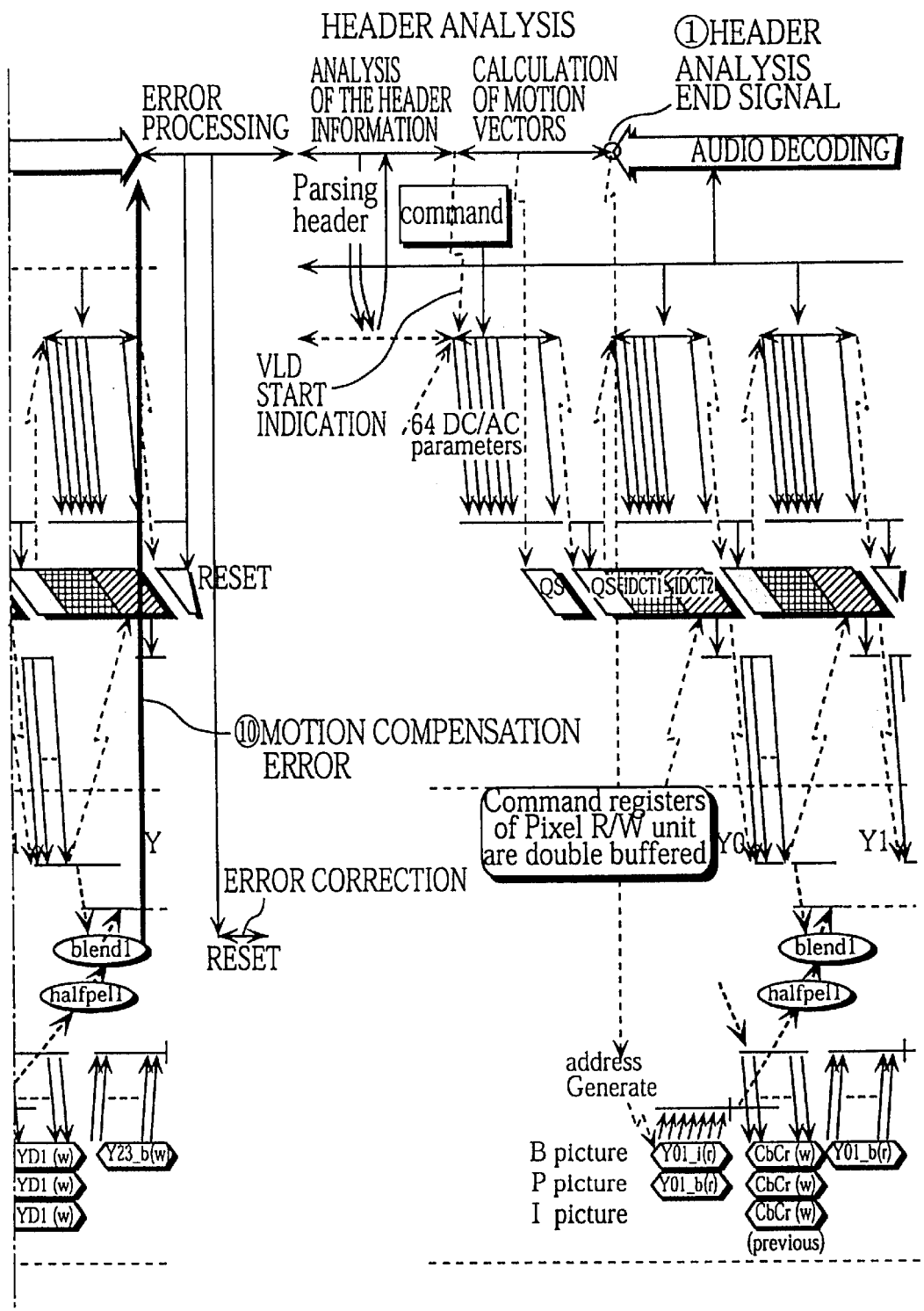

FIGS. 16A and 16B show the operation performed by the pixel read/write unit 11 when a motion compensation error has occurred.

As shown in FIGS. 16A and 16B, on detecting a ⑩ motion compensation error signal that has been outputted by the pixel read/write unit 11 during the audio decode processing of the processor 7, the OS outputs a reset signal to the code translation unit 9, the pixel calculation unit 10, and the pixel read/write unit 11. As a result, the code translation unit 9, pixel calculation unit 10, and pixel read/write unit 11 discard the data relating to the macroblock being decoded. After completing the error processing, the OS sets the video thread in the ready state. This means that in the selection process shown in FIG. 13, the OS sets the video thread into the execute state and so has the processor 7 commence the header analysis processing of a macroblock in the next slice.

The operation hereinafter is the same as in FIGS. 14A and 14B, and so will not be described.

With the construction described above, the media processing apparatus of the present invention splits the decode processing for compressed video data between the sequential processing unit 1003 and the routine processing unit 1004 in the decode processing unit 1002. Compared with conventional techniques where all of the decoding of compressed video data was performed by one processor, the load of the sequential processing unit 1003 and the routine processing unit 1004 can be reduced, thereby raising the overall efficiency of the processing.

The sequential processing unit performs the header analysis processing for each macroblock with priority, which avoids delays to the decode processing of the routine processing unit that is performed based on the results of the header analysis. Since the audio decode processing requires relatively little processing compared to the decoding of compressed video data, this audio decode processing is performed by the sequential processing unit in between the header analysis processing. As a result, the processing can be completed in a shorter time. Since processing efficiency is raised, the decode processing unit 1002 can perform the full decoding of MPEG streams without using a processor with a high-speed operation clock. As a specific example, when the present media processing apparatus is realized using a single LSI chip, a full decode of MPEG streams can be achieved with a processor whose operation clock is below 100 MHz. In tests, a 54 MHz processor was found to be sufficient.

It should be noted that the present invention may be realized by an ordinary computer that includes a standard CPU (Central Processing Unit) and a DSP (Digital Signal Processor). In this case, a header analysis program, an audio decode program, an OS program, and a routine processing program are stored beforehand in the main storage of the personal computer. The header analysis program performs the header analysis for each macroblock included in the compressed video data. The audio decode program decodes the compressed audio data. The OS program switches between the header analysis program and the audio decode program with the former being given priority. The routine processing program performs the decode processing for the compressed video data aside from the header analysis. In such a computer, the standard CPU executes the header analysis program, the audio decode program, and the OS program, while the DSP executes the routine processing program. This means that the standard CPU executes the sequential processing of the sequential processing unit 1003 in the embodiment, while the DSP executes the routine processing of the routine processing unit 1004.

With the above configuration, the standard CPU performs the header analysis program without delay, and performs the audio decode program in the idle time between successive executions of the header analysis program. This increases the throughput of the standard CPU. Also, since the standard CPU performs the header analysis program without delay, the DSP can quickly receive the analysis results of the header analysis program and so quickly commences the execution of the routine processing program.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A computer-readable storage medium storing a program which has a computer decode a data stream including compressed audio data and compressed video data to obtain video data and audio data,
the program comprising:
a header analysis process for analyzing a header of a predetermined block included in the compressed video data in the data stream;
an audio decode process for decoding the compressed audio data in the data stream;
a control process for switching between the header analysis processing and the audio decode process, giving priority to the header analysis processing, wherein the control process includes:
an interrupt detection process for detecting an interrupt that causes a switching between the header analysis process and the audio decode process and a type of interrupt,
a state management process for managing a state of the header analysis process and a state of the audio decode process based on the type of interrupt that has been detected, each state being one of an execute state, a wait state, and a ready state, and
a switching process for switching, when the state of the header analysis process has changed from the wait state to the ready state, a process executed by the computer from the audio decode process to the header analysis process; and
a routine process for performing a decode process for the compressed video data in the data stream, the decode process not including the header analysis process.

2. The computer-readable storage medium of claim 1, wherein the computer is a media processing apparatus that has a first processor and a second processor, the first processor executing the header analysis process, the audio decode process and the control process and the second processor executing the routine process.

3. The computer-readable storage medium of claim 2, wherein the control process includes:
an interrupt detection process for detecting an interrupt that causes a switching between the header analysis process and the audio decode process and a type of interrupt;
a state management process for managing a state of the header analysis process and a state of the audio decode process based on the type of interrupt that has been detected, each state being one of an execute state, a wait state, and a ready state; and
a switching process for switching, when the state of the header analysis process has changed from the wait state to the ready state, a process executed by the first processor from the audio decode process to the header analysis process.

4. A media processing apparatus that decodes a data stream including compressed audio data and compressed video data to obtain video data and audio data, the media processing apparatus comprising:
sequential processing unit operable to perform a header analysis process on the compressed video data and an audio decode process on the compressed audio data, the header analysis process being given priority over the audio decode process and being a header analysis for a predetermined block included in the compressed video data in the data stream, and the audio decode process being a decode process for the compressed audio data, wherein the sequential processing unit includes a processor and a memory that stores a header analysis thread, an audio decode thread, and a thread switching thread,
the processor executing the threads in the memory to provide:
a header analysis unit that performs the header analysis process as a result of the processor executing the header analysis thread in the memory;

an audio decode unit that performs the audio decode process as a result of the processor executing the audio decode thread in the memory; and a control unit that controls a switching of a thread assigned to the processor so that the header analysis process is given priority over the audio decode process, the control unit being realized by the processor executing the control thread, and includes:

an interrupt detection unit to detect an occurrence of any of a plurality of interrupts that cause a switching of thread;

a state management unit to manage a state of the header analysis unit and a state of the audio decode unit based on a type of detected interrupt, each state being one of an execute state, a wait state, and a ready state; and a switching unit for switching, when the state of the header analysis unit has changed from the wait state to the ready state, a thread assigned to the processor to the header analysis thread; and routine processing unit to perform a decode process for the compressed video data aside from the header analysis process, the routine processing unit operating in parallel with the sequential processing unit.

5. The media processing apparatus of claim 4, wherein the state management means includes:

a state table for storing the state of the header analysis means and the state of the audio decode means; and state updating means for updating the state table based on the type of detected interrupt.

6. The media processing apparatus of claim 5, wherein the predetermined block is a macroblock included in the compressed video data in the data stream, the interrupt detecting means being capable of detecting a type 1 interrupt and a type 2 interrupt, the type 1 interrupt being outputted by the header analysis means on completing the header analysis process for one macroblock and the type 2 interrupt being outputted by the routine processing means on completing the decode process for one macroblock, and the state updating means changing the state of the header analysis means in the state table to the wait state when the interrupt detecting means has detected the type 1 interrupt and changing the state of the state of the header analysis means in the state table to the ready state when the interrupt detecting means has detected the type 2 interrupt.

7. The media processing apparatus of claim 4, wherein when the header analysis means is in the wait state and the state of the audio decode means has changed from the wait state to the ready state, the switching means switches a thread assigned to the processor to the audio decode thread.

8. The media processing apparatus of claim 7, wherein the state management means includes:

a state table for storing the state of the header analysis means and the state of the audio decode means; and state updating means for updating the state table based on the type of detected interrupt.

9. The media processing apparatus of claim 8, wherein the predetermined block is a macroblock included in the compressed video data in the data stream, the interrupt detecting means being capable of detecting a type 1 interrupt and a type 2 interrupt, the type 1 interrupt being outputted by the header analysis means on completing the header analysis process for one macroblock and the type 2 interrupt being outputted by the routine processing means on completing the decode process for one macroblock, and the state updating means' changing the state of the header analysis means in the state table to the wait state when the interrupt detecting means has detected the type 1 interrupt and changing the state of the state of the header analysis means in the state table to the ready state when the interrupt detecting means has detected the type 2 interrupt.

10. A media processing apparatus that decodes a data stream including compressed audio data and compressed video data to obtain video data and audio data, the media processing apparatus comprising:

sequential processing unit operable to perform a header analysis process on the compressed video data and an audio decode process on the compressed audio data, the header analysis process being given priority over the audio decode process and being a header analysis for a predetermined block included in the compressed video data in the data stream, and the audio decode process being a decode process for the compressed audio data, wherein the sequential processing unit includes a processor and a memory that stores a header analysis thread, an audio decode thread, and a thread switching thread, the processor executing the threads in the memory to provide:

header analysis unit that performs the header analysis process as a result of the processor executing the header analysis thread in the memory;

audio decode unit that performs the audio decode process as a result of the processor executing the audio decode thread in the memory; and control unit that controls a switching of a thread assigned to the processor so that the header analysis process is given priority over the audio decode process, the control unit being realized by the processor executing the control thread; and routine processing unit for performing a decode process for the compressed video data aside from the header analysis process, the routine processing unit operating in parallel with the sequential processing unit, wherein the routine processing unit includes:

a data conversion unit to perform a variable length decode on the compressed video data;

a calculation unit to perform an inverse quantization and an inverse discrete cosine transform on image blocks resulting from the variable length decode; and a synthesizing unit for performing a motion compensation process by synthesizing image blocks resulting from the inverse discrete cosine transform with previously decoded image blocks to produce decoded image data, the header analysis unit including:

an obtaining unit for issuing obtaining header information that has been subjected to a variable length decode by issuing an indication to the data conversion unit;

an analysis unit to perform an analysis on the obtained header information and then calculating motion vectors;

a notification unit to notify the routine processing unit of parameters obtained by the analysis of the analysis unit; and a start indication unit operable to issue a start indication to the data conversion unit at a predetermined point during the header analysis processing, the start indication unit having the data conversion unit start a variable length decode on compressed image data aside from the header information.

11. The media processing apparatus of claim 10,
wherein the start indication means issues the start indication before the analysis means calculates the motion vectors, and the notification means notifies the synthesis means of the calculated motion vectors.

12. The media processing apparatus of claim 11,
wherein the control means includes:
  interrupt detection means for detecting an occurrence of an interrupt that causes a switching of thread;
  error processing means for having the routine processing means discard data relating to a predetermined block when an error interrupt has been detected by the interrupt detection means and for changing a state of the header analysis means to a ready state; and
  state management means for managing a state of the header analysis means and a state of the audio decode means based on a type of detected interrupt, each state being one of an execute state, a wait state, and a ready state; and
  switching means for switching a thread assigned to the processor to the header analysis thread when the state of the header analysis means has changed from the wait state to the ready state.

13. The media processing apparatus of claim 12,
wherein the state management means includes:
  a state table for storing the state of the header analysis means and the state of the audio decode means; and
  state updating means for updating the state table based on the type of detected interrupt.

14. The media processing apparatus of claim 13,
wherein the predetermined block is a macroblock included in the compressed video data in the data stream,
the interrupt detecting means being capable of detecting a type 1 interrupt, a type 2 interrupt, a type 3 interrupt and a type 4 interrupt,
the type 1 interrupt being outputted by the header analysis means on completing the header analysis process for one macroblock,
the type 2 interrupt being outputted by the routine processing means on completing the decode process for one macroblock,
the type 3 interrupt being outputted by the data conversion means when an error has occurred during a variable length decode,
the type 4 interrupt being outputted by the synthesizing means when an error has occurred during the motion compensation process,
wherein the state updating means changes the state of-the header analysis means in the state table to the wait state when the interrupt detecting means has detected the type 1 interrupt and changes the state of the state of the header analysis means in the state table to the ready state when the interrupt detecting means has detected the type 2 interrupt, and
wherein when one of the type 3 interrupt and the type 4 interrupt has been detected by the interrupt detection means, the error processing means has the routine processing means discard data relating to a predetermined block and the state updating means changes the state of the header analysis means to the ready state.

15. The media processing apparatus of claim 11,
wherein the control means includes:
  interrupt detection means for detecting an occurrence of an interrupt that causes a switching of thread;
  error processing means for having the routine processing means discard data relating to a predetermined block when an error interrupt has been detected by the interrupt detection means and for changing a state of the header analysis means to a ready state; and
  state management means for managing a state of the header analysis means and a state of the audio decode means based on a type of detected interrupt, each state being one of an execute state, a wait state, and a ready state; and
  switching means for switching a thread assigned to the processor to the header analysis thread when the state of the header analysis means has changed from the wait state to the ready state.

16. The media processing apparatus of claim 15,
wherein the state management means includes:
  a state table for storing the state of the header analysis means and the state of the audio decode means; and
  state updating means for updating the state table based on the type of detected interrupt.

17. The media processing apparatus of claim 16,
wherein the predetermined block is a macroblock included in the compressed video data in the data stream,
the interrupt detecting means being capable of detecting a type 1 interrupt, a type 2 interrupt, a type 3 interrupt and a type 4 interrupt,
the type 1 interrupt being outputted by the header analysis means on completing the header analysis process for one macroblock,
the type 2 interrupt being outputted by the routine processing means on completing the decode process for one macroblock,
the type 3 interrupt being outputted by the data conversion means when an error has occurred during a variable length decode,
the type 4 interrupt being outputted by the synthesizing means when an error has occurred during the motion compensation process,
wherein the state updating means changes the state of the header analysis means in the state table to the wait state when the interrupt detecting means has detected the type 1 interrupt and changes the state of the state of the header analysis means in the state table to the ready state when the interrupt detecting means has detected the type 2 interrupt, and
wherein when one of the type 3 interrupt and the type 4 interrupt has been detected by the interrupt detection means, the error processing means has the routine processing means discard data relating to a predetermined block and the state updating means changes the state of the header analysis means to the ready state.

18. The media processing apparatus of claim 10 wherein the control includes:
  interrupt detection means for detecting an occurrence of any of a plurality of interrupts that cause a switching of thread;

state management means for managing a state of the header analysis means and a state of the audio decode means based on a type of detected interrupt, each state being one of an execute state, a wait state, and a ready state; and switching means for switching, when the state of the header analysis means has changed from the wait state to the ready state, a thread assigned to the processor to the header analysis thread.

19. The media processing apparatus of claim 18, wherein the state management means includes:
   a state table for storing the state of the header analysis means and the state of the audio decode means; and
   state updating means for updating the state table based on the type of detected interrupt.

20. The media processing apparatus of claim 19, wherein the interrupt detecting means is capable of detecting eight types of interrupts numbered type 1 to type 8, a type 1 interrupt being outputted by the header analysis means on completing the header analysis process for a predetermined block, a type 2 interrupt being outputted by the routine processing means on completing the decode process for a predetermined block, a type 3 interrupt being outputted by the header analysis means on completing the header analysis process for every predetermined block in a frame, a type 4 interrupt being outputted by the data conversion means if the variable length decode is not complete for the header information when the obtaining means issues the indication, a type 5 interrupt being a vertical synch signal inputted from outside the media processing apparatus, a type 6 interrupt being outputted by the data conversion means after the type 4 interrupt when the variable length decode is complete for the header information, a type 7 interrupt being outputted by the memory when the memory does not have data that has been requested by the audio decode means, and a type 8 interrupt being outputted by the memory after the type 7 interrupt when the data that has been requested by the audio decode means has been inputted into the memory, the state updating means changing
   the state of the header analysis means in the state table to the wait state when the interrupt detection means has detected any of the type 1 interrupt, the type 3 interrupt, and the type 4 interrupt,
   the state of the header analysis means in the state table to the ready state when the interrupt detection means has detected any of the type 2 interrupt, the type 5 interrupt and the type 6 interrupt,
   the state of the audio decode means in the state table to the wait state when the interrupt detection means has detected the type 7 interrupt, and
   the state of the audio decode means in the state table to the ready state when the interrupt detection means has detected the type 8 interrupt.

* * * * *